(12) United States Patent
Valianatos et al.

(10) Patent No.: US 9,005,494 B2
(45) Date of Patent: Apr. 14, 2015

(54) PREPARATION OF CAPSULES

(75) Inventors: Peter J. Valianatos, Charlestown, MA (US); Rajesh Chebiyam, Nashua, NH (US); Jeremy J. Manning, Kingston, MA (US); Michael L. Steiner, New Richmond, WI (US); Thomas H. Whitesides, Victoria (CA); Michael D. Walls, Dorchester, MA (US)

(73) Assignee: E Ink Corporation, Billerica, MA (US)

( * ) Notice: Subject to any disclaimer, the term of this patent is extended or adjusted under 35 U.S.C. 154(b) by 799 days.

(21) Appl. No.: 12/538,228

(22) Filed: Aug. 10, 2009

(65) Prior Publication Data

US 2010/0044894 A1   Feb. 25, 2010

Related U.S. Application Data

(63) Continuation of application No. 10/905,746, filed on Jan. 19, 2005, now abandoned.

(60) Provisional application No. 60/481,920, filed on Jan. 20, 2004, provisional application No. 60/521,010, filed on Feb. 5, 2004.

(51) Int. Cl.
  *B01J 13/02* (2006.01)
  *C08F 130/08* (2006.01)
  *B01J 13/08* (2006.01)
  *G02F 1/167* (2006.01)

(52) U.S. Cl.
  CPC . *B01J 13/08* (2013.01); *G02F 1/167* (2013.01)

(58) Field of Classification Search
  USPC ......... 428/402–402.24, 403, 404, 407, 321.1, 428/474.4; 427/331, 389.9, 212, 427/213–213.36, 483, 256; 264/534, 5, 41, 264/4–4.7; 424/400, 408, 450, 451, 455, 424/93.7, 184.1, 497, 489, 501, 490, 491, 424/492, 493, 494, 495
  See application file for complete search history.

(56) References Cited

U.S. PATENT DOCUMENTS 2,766,478 A   10/1956   Raley, Jr. et al.
2,800,457 A    7/1957   Green et al.
(Continued)

FOREIGN PATENT DOCUMENTS

CH          563807        7/1975
EP     0 281 204 A2      9/1988
(Continued)

OTHER PUBLICATIONS

Amundson, K., "Electrephoretic Imaging Films for Electronic Paper Displays" in Crawford, G. ed. Flexible Flat Panel Displays, John Wiley & Sons, Ltd., Hoboken, NJ: 2005.
(Continued)

*Primary Examiner* — James J Seidleck
*Assistant Examiner* — S. Camilla Pourbohloul
(74) *Attorney, Agent, or Firm* — David J. Cole

(57) ABSTRACT

Prior art processes for producing protein-based capsules (for example, capsules for use in electrophoretic media) tend to be wasteful because they produce many capsules outside the desired size range, which is typically about 20 to 50 μm. Capsule size distribution and yields can be improved by either (a) emulsifying a water-immiscible phase in a preformed coacervate of the protein; or (b) using a limited coalescence process with colloidal alumina as the surface-active particulate material.

14 Claims, 5 Drawing Sheets

(56) References Cited

U.S. PATENT DOCUMENTS

| | | | |
|---|---|---|---|
| 2,932,629 A | 4/1960 | Wiley et al. |
| 3,036,388 A | 5/1962 | Tate |
| 3,384,488 A | 5/1968 | Tulagin et al. |
| 3,389,194 A | 6/1968 | Somerville |
| 3,406,363 A | 10/1968 | Tate |
| 3,423,489 A | 1/1969 | Arens et al. |
| 3,460,248 A | 8/1969 | Tate |
| 3,585,381 A | 6/1971 | Hodson et al. |
| 3,612,758 A | 10/1971 | Evans et al. |
| 3,668,106 A | 6/1972 | Ota |
| 3,670,323 A | 6/1972 | Sobel et al. |
| 3,756,693 A | 9/1973 | Ota |
| 3,767,392 A | 10/1973 | Ota |
| 3,772,013 A | 11/1973 | Wells |
| 3,792,308 A | 2/1974 | Ota |
| 3,806,893 A | 4/1974 | Ohnishi et al. |
| 3,850,627 A | 11/1974 | Wells et al. |
| 3,855,146 A * | 12/1974 | Saeki et al. .................... 264/4.3 |
| 3,870,517 A | 3/1975 | Ota et al. |
| 3,892,568 A | 7/1975 | Ota |
| 3,909,116 A | 9/1975 | Kohashi |
| 3,922,255 A | 11/1975 | Koestler et al. |
| 4,001,140 A | 1/1977 | Foris et al. |
| 4,041,481 A | 8/1977 | Sato |
| 4,045,327 A | 8/1977 | Noma et al. |
| 4,062,009 A | 12/1977 | Raverdy et al. |
| 4,068,927 A | 1/1978 | White |
| 4,071,430 A | 1/1978 | Liebert |
| 4,078,856 A | 3/1978 | Thompson et al. |
| 4,088,395 A | 5/1978 | Giglia |
| 4,093,534 A | 6/1978 | Carter et al. |
| 4,123,206 A | 10/1978 | Dannelly |
| 4,123,346 A | 10/1978 | Ploix |
| 4,126,528 A | 11/1978 | Chiang |
| 4,126,854 A | 11/1978 | Sheridon |
| 4,143,103 A | 3/1979 | Sheridon |
| 4,143,472 A | 3/1979 | Murata et al. |
| 4,147,932 A | 4/1979 | Lewis |
| 4,149,149 A | 4/1979 | Miki et al. |
| 4,166,800 A | 9/1979 | Fong |
| 4,196,437 A | 4/1980 | Hertz |
| 4,201,691 A | 5/1980 | Asher et al. |
| 4,203,106 A | 5/1980 | Dalisa et al. |
| 4,211,668 A | 7/1980 | Tate |
| 4,218,302 A | 8/1980 | Dalisa et al. |
| 4,231,641 A | 11/1980 | Randin |
| 4,261,653 A | 4/1981 | Goodrich |
| 4,272,596 A | 6/1981 | Harbour et al. |
| 4,273,672 A | 6/1981 | Vassiliades |
| 4,279,632 A | 7/1981 | Frosch et al. |
| 4,285,801 A | 8/1981 | Chiang |
| 4,298,448 A | 11/1981 | Muller et al. |
| 4,303,433 A | 12/1981 | Torobin |
| 4,305,807 A | 12/1981 | Somlyody |
| 4,311,361 A | 1/1982 | Somlyody |
| 4,314,013 A | 2/1982 | Chang |
| 4,324,456 A | 4/1982 | Dalisa |
| 4,368,952 A | 1/1983 | Murata et al. |
| 4,390,403 A | 6/1983 | Batchelder |
| 4,418,346 A | 11/1983 | Batchelder |
| 4,419,383 A | 12/1983 | Lee |
| 4,422,082 A | 12/1983 | Louzil |
| 4,438,160 A | 3/1984 | Ishikawa et al. |
| 4,439,507 A | 3/1984 | Pan et al. |
| 4,444,961 A | 4/1984 | Timm |
| 4,450,440 A | 5/1984 | White |
| 4,502,934 A | 3/1985 | Gazard et al. |
| 4,522,472 A | 6/1985 | Liebert et al. |
| 4,538,156 A | 8/1985 | Durkee et al. |
| 4,543,306 A | 9/1985 | Dubois et al. |
| 4,605,284 A | 8/1986 | Fergason |
| 4,620,916 A | 11/1986 | Zwemer et al. |
| 4,623,706 A | 11/1986 | Timm et al. |
| 4,643,528 A | 2/1987 | Bell, Jr. |
| 4,648,956 A | 3/1987 | Marshall et al. |
| 4,655,897 A | 4/1987 | DiSanto et al. |
| 4,666,673 A | 5/1987 | Timm |
| 4,673,303 A | 6/1987 | Sansone et al. |
| 4,707,080 A | 11/1987 | Fergason |
| 4,732,830 A | 3/1988 | DiSanto et al. |
| 4,742,345 A | 5/1988 | DiSanto et al. |
| 4,746,917 A | 5/1988 | DiSanto et al. |
| 4,748,366 A | 5/1988 | Taylor |
| 4,833,464 A | 5/1989 | DiSanto et al. |
| 4,888,140 A | 12/1989 | Schlameus et al. |
| 4,889,603 A | 12/1989 | DiSanto et al. |
| 4,891,245 A | 1/1990 | Micale |
| 4,909,959 A | 3/1990 | Lemaire et al. |
| 4,919,521 A | 4/1990 | Tada et al. |
| 4,931,019 A | 6/1990 | Park |
| 4,947,219 A | 8/1990 | Boehm |
| 4,960,351 A | 10/1990 | Kendall, Jr. et al. |
| 4,965,131 A | 10/1990 | Nair et al. |
| 5,009,490 A | 4/1991 | Kouno et al. |
| 5,017,225 A | 5/1991 | Nakanishi et al. |
| 5,040,960 A | 8/1991 | Shioya et al. |
| 5,041,824 A | 8/1991 | DiSanto et al. |
| 5,053,763 A | 10/1991 | DiSanto et al. |
| 5,057,363 A | 10/1991 | Nakanishi |
| 5,059,694 A | 10/1991 | Delabouglise et al. |
| 5,066,105 A | 11/1991 | Yoshimoto et al. |
| 5,066,559 A | 11/1991 | Elmasry et al. |
| 5,066,946 A | 11/1991 | DiSanto et al. |
| 5,070,326 A | 12/1991 | Yoshimoto et al. |
| 5,077,157 A | 12/1991 | DiSanto et al. |
| 5,082,351 A | 1/1992 | Fergason |
| 5,099,256 A | 3/1992 | Anderson |
| 5,105,185 A | 4/1992 | Nakanowatari et al. |
| 5,128,226 A | 7/1992 | Hung |
| 5,128,785 A | 7/1992 | Yoshimoto et al. |
| 5,132,049 A | 7/1992 | Garreau et al. |
| 5,138,472 A | 8/1992 | Jones et al. |
| 5,149,826 A | 9/1992 | Delabouglise et al. |
| 5,151,032 A | 9/1992 | Igawa |
| 5,174,882 A | 12/1992 | DiSanto et al. |
| 5,177,476 A | 1/1993 | DiSanto et al. |
| 5,185,226 A | 2/1993 | Grosso et al. |
| 5,187,609 A | 2/1993 | DiSanto et al. |
| 5,204,424 A | 4/1993 | Roncali et al. |
| 5,216,416 A | 6/1993 | DiSanto et al. |
| 5,216,530 A | 6/1993 | Pearlman et al. |
| 5,223,115 A | 6/1993 | DiSanto et al. |
| 5,223,823 A | 6/1993 | DiSanto et al. |
| 5,247,290 A | 9/1993 | DiSanto et al. |
| 5,250,932 A | 10/1993 | Yoshimoto et al. |
| 5,250,938 A | 10/1993 | DiSanto et al. |
| 5,254,981 A | 10/1993 | DiSanto et al. |
| 5,255,017 A | 10/1993 | Lam |
| 5,260,002 A | 11/1993 | Wang |
| 5,262,098 A | 11/1993 | Crowley et al. |
| 5,266,098 A | 11/1993 | Chun et al. |
| 5,266,937 A | 11/1993 | DiSanto et al. |
| 5,268,448 A | 12/1993 | Buechner et al. |
| 5,270,843 A | 12/1993 | Wang |
| 5,272,238 A | 12/1993 | Garnier et al. |
| 5,276,113 A | 1/1994 | Hashiguchi et al. |
| 5,276,438 A | 1/1994 | DiSanto et al. |
| 5,279,511 A | 1/1994 | DiSanto et al. |
| 5,279,694 A | 1/1994 | DiSanto et al. |
| 5,293,528 A | 3/1994 | DiSanto et al. |
| 5,296,974 A | 3/1994 | Tada et al. |
| 5,298,833 A | 3/1994 | Hou |
| 5,302,235 A | 4/1994 | DiSanto et al. |
| 5,303,073 A | 4/1994 | Shirota et al. |
| 5,304,439 A | 4/1994 | DiSanto et al. |
| 5,315,312 A | 5/1994 | DiSanto et al. |
| 5,326,484 A | 7/1994 | Nakashima et al. |
| 5,344,594 A | 9/1994 | Sheridon |
| 5,359,346 A | 10/1994 | DiSanto et al. |
| 5,360,689 A | 11/1994 | Hou et al. |
| 5,372,852 A | 12/1994 | Titterington et al. |
| 5,380,362 A | 1/1995 | Schubert |
| 5,383,008 A | 1/1995 | Sheridon |
| 5,389,945 A | 2/1995 | Sheridon |

(56) References Cited

U.S. PATENT DOCUMENTS

| | | |
|---|---|---|
| 5,389,958 A | 2/1995 | Bui et al. |
| 5,402,145 A | 3/1995 | DiSanto et al. |
| 5,403,518 A | 4/1995 | Schubert |
| 5,411,398 A | 5/1995 | Nakanishi et al. |
| 5,411,656 A | 5/1995 | Schubert |
| 5,421,926 A | 6/1995 | Yukinobu et al. |
| 5,463,492 A | 10/1995 | Check, III |
| 5,467,107 A | 11/1995 | DiSanto et al. |
| 5,471,233 A | 11/1995 | Okamoto et al. |
| 5,498,674 A | 3/1996 | Hou et al. |
| 5,502,476 A | 3/1996 | Neal et al. |
| 5,508,068 A | 4/1996 | Nakano |
| 5,512,162 A | 4/1996 | Sachs et al. |
| 5,543,177 A | 8/1996 | Morrison et al. |
| 5,543,219 A | 8/1996 | Elwakil |
| 5,552,679 A | 9/1996 | Murasko |
| 5,556,583 A | 9/1996 | Tashiro et al. |
| 5,561,443 A | 10/1996 | DiSanto et al. |
| 5,565,885 A | 10/1996 | Tamanoi |
| 5,571,311 A | 11/1996 | Belmont et al. |
| 5,582,700 A | 12/1996 | Bryning et al. |
| 5,583,675 A | 12/1996 | Yamada et al. |
| 5,597,889 A | 1/1997 | Takimoto et al. |
| 5,604,027 A | 2/1997 | Sheridon |
| 5,604,070 A | 2/1997 | Rao et al. |
| 5,610,455 A | 3/1997 | Allen et al. |
| 5,614,340 A | 3/1997 | Bugner et al. |
| 5,620,704 A | 4/1997 | Cade et al. |
| 5,627,561 A | 5/1997 | Laspina et al. |
| 5,635,317 A | 6/1997 | Taniguchi et al. |
| 5,638,103 A | 6/1997 | Obata et al. |
| 5,639,914 A | 6/1997 | Tomiyama et al. |
| 5,643,506 A | 7/1997 | Rourke |
| 5,643,673 A | 7/1997 | Hou |
| 5,650,247 A | 7/1997 | Taniguchi et al. |
| 5,650,872 A | 7/1997 | Saxe et al. |
| 5,654,367 A | 8/1997 | Takimoto et al. |
| 5,663,224 A | 9/1997 | Emmons et al. |
| 5,672,381 A | 9/1997 | Rajan |
| 5,673,148 A | 9/1997 | Morris et al. |
| 5,676,884 A | 10/1997 | Tiers et al. |
| 5,691,098 A | 11/1997 | Busman et al. |
| 5,693,442 A | 12/1997 | Weiss et al. |
| 5,694,224 A | 12/1997 | Tai |
| 5,707,738 A | 1/1998 | Hou |
| 5,707,747 A | 1/1998 | Tomiyama et al. |
| 5,708,525 A | 1/1998 | Sheridon |
| 5,709,976 A | 1/1998 | Malhotra |
| 5,714,270 A | 2/1998 | Malhotra et al. |
| 5,715,511 A | 2/1998 | Aslam et al. |
| 5,716,550 A | 2/1998 | Gardner et al. |
| 5,717,283 A | 2/1998 | Biegelsen et al. |
| 5,717,514 A | 2/1998 | Sheridon |
| 5,717,515 A | 2/1998 | Sheridon |
| 5,725,935 A | 3/1998 | Rajan |
| 5,729,632 A | 3/1998 | Tai |
| 5,737,115 A | 4/1998 | Mackinlay et al. |
| 5,739,801 A | 4/1998 | Sheridon |
| 5,745,094 A | 4/1998 | Gordon, II et al. |
| 5,751,268 A | 5/1998 | Sheridon |
| 5,753,763 A | 5/1998 | Rao et al. |
| 5,754,332 A | 5/1998 | Crowley |
| 5,759,671 A | 6/1998 | Tanaka et al. |
| 5,760,761 A | 6/1998 | Sheridon |
| 5,767,826 A | 6/1998 | Sheridon et al. |
| 5,777,782 A | 7/1998 | Sheridon |
| 5,783,614 A | 7/1998 | Chen et al. |
| 5,808,783 A | 9/1998 | Crowley |
| 5,825,529 A | 10/1998 | Crowley |
| 5,828,432 A | 10/1998 | Shashidhar et al. |
| 5,843,259 A | 12/1998 | Narang et al. |
| 5,872,552 A | 2/1999 | Gordon, II et al. |
| 5,900,858 A | 5/1999 | Richley |
| 5,914,806 A | 6/1999 | Gordon, II et al. |
| 5,930,026 A | 7/1999 | Jacobson et al. |
| 5,961,804 A | 10/1999 | Jacobson et al. |
| 5,993,850 A | 11/1999 | Sankaram et al. |
| 5,993,851 A | 11/1999 | Foldvari |
| 6,014,247 A | 1/2000 | Winter et al. |
| 6,017,584 A | 1/2000 | Albert et al. |
| 6,054,071 A | 4/2000 | Mikkelsen, Jr. |
| 6,055,091 A | 4/2000 | Sheridon et al. |
| 6,067,185 A | 5/2000 | Albert et al. |
| 6,097,531 A | 8/2000 | Sheridon |
| 6,103,269 A | 8/2000 | Wunderlich et al. |
| 6,103,271 A | 8/2000 | Morrison et al. |
| 6,118,426 A | 9/2000 | Albert et al. |
| 6,120,588 A | 9/2000 | Jacobson |
| 6,120,839 A | 9/2000 | Comiskey et al. |
| 6,124,851 A | 9/2000 | Jacobson |
| 6,128,124 A | 10/2000 | Silverman |
| 6,130,773 A | 10/2000 | Jacobson et al. |
| 6,130,774 A | 10/2000 | Albert et al. |
| 6,137,467 A | 10/2000 | Sheridon et al. |
| 6,144,361 A | 11/2000 | Gordon, II et al. |
| 6,147,791 A | 11/2000 | Sheridon |
| 6,172,798 B1 | 1/2001 | Albert et al. |
| 6,177,921 B1 | 1/2001 | Comiskey et al. |
| 6,184,856 B1 | 2/2001 | Gordon, II et al. |
| 6,214,300 B1 | 4/2001 | Morrison et al. |
| 6,225,971 B1 | 5/2001 | Gordon, II et al. |
| 6,232,950 B1 | 5/2001 | Albert et al. |
| 6,241,921 B1 | 6/2001 | Jacobson et al. |
| 6,249,271 B1 | 6/2001 | Albert et al. |
| 6,252,564 B1 | 6/2001 | Albert et al. |
| 6,262,706 B1 | 7/2001 | Albert et al. |
| 6,262,833 B1 | 7/2001 | Loxley et al. |
| 6,271,823 B1 | 8/2001 | Gordon, II et al. |
| 6,300,932 B1 | 10/2001 | Albert |
| 6,301,038 B1 | 10/2001 | Fitzmaurice et al. |
| 6,312,304 B1 | 11/2001 | Duthaler et al. |
| 6,312,971 B1 | 11/2001 | Amundson et al. |
| 6,323,989 B1 | 11/2001 | Jacobson et al. |
| 6,327,072 B1 | 12/2001 | Comiskey et al. |
| 6,376,828 B1 | 4/2002 | Comiskey |
| 6,377,387 B1 | 4/2002 | Duthaler et al. |
| 6,392,785 B1 | 5/2002 | Albert et al. |
| 6,392,786 B1 | 5/2002 | Albert |
| 6,413,790 B1 | 7/2002 | Duthaler et al. |
| 6,422,687 B1 | 7/2002 | Jacobson |
| 6,445,374 B2 | 9/2002 | Albert et al. |
| 6,445,489 B1 | 9/2002 | Jacobson et al. |
| 6,459,418 B1 | 10/2002 | Comiskey et al. |
| 6,473,072 B1 | 10/2002 | Comiskey et al. |
| 6,480,182 B2 | 11/2002 | Turner et al. |
| 6,498,114 B1 | 12/2002 | Amundson et al. |
| 6,504,524 B1 | 1/2003 | Gates et al. |
| 6,506,438 B2 | 1/2003 | Duthaler et al. |
| 6,512,354 B2 | 1/2003 | Jacobson et al. |
| 6,515,649 B1 | 2/2003 | Albert et al. |
| 6,518,949 B2 | 2/2003 | Drzaic |
| 6,521,489 B2 | 2/2003 | Duthaler et al. |
| 6,531,997 B1 | 3/2003 | Gates et al. |
| 6,535,197 B1 | 3/2003 | Comiskey et al. |
| 6,538,801 B2 | 3/2003 | Jacobson et al. |
| 6,545,291 B1 | 4/2003 | Amundson et al. |
| 6,580,545 B2 | 6/2003 | Morrison et al. |
| 6,639,578 B1 | 10/2003 | Comiskey et al. |
| 6,652,075 B2 | 11/2003 | Jacobson |
| 6,657,772 B2 | 12/2003 | Loxley |
| 6,664,944 B1 | 12/2003 | Albert et al. |
| D485,294 S | 1/2004 | Albert |
| 6,672,921 B1 | 1/2004 | Liang et al. |
| 6,680,725 B1 | 1/2004 | Jacobson |
| 6,683,333 B2 | 1/2004 | Kazlas et al. |
| 6,693,620 B1 | 2/2004 | Herb et al. |
| 6,704,133 B2 | 3/2004 | Gates et al. |
| 6,710,540 B1 | 3/2004 | Albert et al. |
| 6,721,083 B2 | 4/2004 | Jacobson et al. |
| 6,724,519 B1 | 4/2004 | Comiskey et al. |
| 6,727,881 B1 | 4/2004 | Albert et al. |
| 6,738,050 B2 | 5/2004 | Comiskey et al. |
| 6,750,473 B2 | 6/2004 | Amundson et al. |
| 6,753,999 B2 | 6/2004 | Zehner et al. |

(56) References Cited

U.S. PATENT DOCUMENTS

| | | |
|---|---|---|
| 6,788,449 B2 | 9/2004 | Liang et al. |
| 6,816,147 B2 | 11/2004 | Albert |
| 6,819,471 B2 | 11/2004 | Amundson et al. |
| 6,822,782 B2 | 11/2004 | Honeyman et al. |
| 6,825,068 B2 | 11/2004 | Denis et al. |
| 6,825,829 B1 | 11/2004 | Albert et al. |
| 6,825,970 B2 | 11/2004 | Goenaga et al. |
| 6,831,769 B2 | 12/2004 | Holman et al. |
| 6,839,158 B2 | 1/2005 | Albert et al. |
| 6,842,167 B2 | 1/2005 | Albert et al. |
| 6,842,279 B2 | 1/2005 | Amundson |
| 6,842,657 B1 | 1/2005 | Drzaic et al. |
| 6,864,875 B2 | 3/2005 | Drzaic et al. |
| 6,865,010 B2 | 3/2005 | Duthaler et al. |
| 6,866,760 B2 | 3/2005 | Paolini, Jr. et al. |
| 6,870,657 B1 | 3/2005 | Fitzmaurice et al. |
| 6,870,661 B2 | 3/2005 | Pullen et al. |
| 6,900,851 B2 | 5/2005 | Morrison et al. |
| 6,922,276 B2 | 7/2005 | Zhang et al. |
| 6,950,220 B2 | 9/2005 | Abramson et al. |
| 6,958,848 B2 | 10/2005 | Cao et al. |
| 6,967,640 B2 | 11/2005 | Albert et al. |
| 6,980,196 B1 | 12/2005 | Turner et al. |
| 6,982,178 B2 | 1/2006 | LeCain et al. |
| 6,987,603 B2 | 1/2006 | Paolini, Jr. et al. |
| 6,995,550 B2 | 2/2006 | Jacobson et al. |
| 7,002,728 B2 * | 2/2006 | Pullen et al. ............... 359/296 |
| 7,012,600 B2 | 3/2006 | Zehner et al. |
| 7,012,735 B2 | 3/2006 | Honeyman et al. |
| 2002/0060321 A1 | 5/2002 | Kazlas et al. |
| 2002/0063661 A1 | 5/2002 | Comiskey et al. |
| 2002/0090980 A1 | 7/2002 | Wilcox et al. |
| 2002/0113770 A1 | 8/2002 | Jacobson et al. |
| 2002/0130832 A1 | 9/2002 | Baucom et al. |
| 2002/0180687 A1 * | 12/2002 | Webber ..................... 345/107 |
| 2003/0011560 A1 | 1/2003 | Albert et al. |
| 2003/0102858 A1 | 6/2003 | Jacobson et al. |
| 2003/0132908 A1 | 7/2003 | Herb et al. |
| 2003/0151702 A1 | 8/2003 | Morrison et al. |
| 2003/0222315 A1 | 12/2003 | Amundson et al. |
| 2004/0014265 A1 | 1/2004 | Kazlas et al. |
| 2004/0075634 A1 | 4/2004 | Gates |
| 2004/0094422 A1 | 5/2004 | Pullen et al. |
| 2004/0105036 A1 | 6/2004 | Danner et al. |
| 2004/0112750 A1 | 6/2004 | Jacobson et al. |
| 2004/0119681 A1 | 6/2004 | Albert et al. |
| 2004/0136048 A1 | 7/2004 | Arango et al. |
| 2004/0155857 A1 | 8/2004 | Duthaler et al. |
| 2004/0180476 A1 | 9/2004 | Kazlas et al. |
| 2004/0190114 A1 | 9/2004 | Jacobson et al. |
| 2004/0196215 A1 | 10/2004 | Duthaler et al. |
| 2004/0226820 A1 | 11/2004 | Webber et al. |
| 2004/0239614 A1 | 12/2004 | Amundson et al. |
| 2004/0252360 A1 | 12/2004 | Webber et al. |
| 2004/0257635 A1 | 12/2004 | Paolini, Jr. et al. |
| 2004/0263947 A1 | 12/2004 | Drzaic et al. |
| 2005/0001812 A1 | 1/2005 | Amundson et al. |
| 2005/0007336 A1 | 1/2005 | Albert et al. |
| 2005/0012980 A1 | 1/2005 | Wilcox et al. |
| 2005/0017944 A1 | 1/2005 | Albert |
| 2005/0018273 A1 | 1/2005 | Honeyman et al. |
| 2005/0024353 A1 | 2/2005 | Amundson et al. |
| 2005/0035941 A1 | 2/2005 | Albert et al. |
| 2005/0041004 A1 | 2/2005 | Gates et al. |
| 2005/0062714 A1 | 3/2005 | Zehner et al. |
| 2005/0067656 A1 | 3/2005 | Denis et al. |
| 2005/0078099 A1 | 4/2005 | Amundson et al. |
| 2005/0105159 A1 | 5/2005 | Paolini, Jr. et al. |
| 2005/0122284 A1 | 6/2005 | Gates et al. |
| 2005/0122306 A1 | 6/2005 | Wilcox et al. |
| 2005/0122563 A1 | 6/2005 | Honeyman et al. |
| 2005/0122564 A1 | 6/2005 | Zehner et al. |
| 2005/0122565 A1 | 6/2005 | Doshi et al. |
| 2005/0151709 A1 | 7/2005 | Jacobson et al. |
| 2005/0152022 A1 | 7/2005 | Honeyman et al. |
| 2005/0168799 A1 | 8/2005 | Whitesides et al. |
| 2005/0168801 A1 | 8/2005 | O'Neil et al. |
| 2005/0179642 A1 | 8/2005 | Wilcox et al. |
| 2005/0179983 A1 | 8/2005 | Sakai et al. |

FOREIGN PATENT DOCUMENTS

| | | |
|---|---|---|
| EP | 0 404 545 A2 | 12/1990 |
| EP | 0 443 571 A2 | 8/1991 |
| EP | 1 145 072 B1 | 5/2003 |
| GB | 1 314 906 | 4/1973 |
| GB | 1 465 701 | 3/1977 |
| GB | 2 306 229 A | 4/1997 |
| JP | 53-073098 | 6/1978 |
| JP | 54-111368 A | 8/1979 |
| JP | 55-096922 A | 7/1980 |
| JP | 60-189731 A | 9/1985 |
| JP | 62-058222 A | 3/1987 |
| JP | 62-231930 A | 10/1987 |
| JP | 62-269124 A | 11/1987 |
| JP | 62-299824 A | 12/1987 |
| JP | 01-086117 A | 3/1989 |
| JP | 64-086116 | 3/1989 |
| JP | 64-086118 | 3/1989 |
| JP | 01-142537 A | 6/1989 |
| JP | 01-177517 A | 7/1989 |
| JP | 01-248182 A | 10/1989 |
| JP | 01-267525 A | 10/1989 |
| JP | 02-223934 A | 9/1990 |
| JP | 02-223935 A | 9/1990 |
| JP | 02-223936 A | 9/1990 |
| JP | 02-284124 A | 11/1990 |
| JP | 02-284125 A | 11/1990 |
| JP | 05-061421 A | 3/1993 |
| JP | 05-165064 A | 6/1993 |
| JP | 05-173194 A | 7/1993 |
| JP | 05-307197 A | 11/1993 |
| JP | 08-234176 A | 9/1996 |
| JP | 09-006277 A | 1/1997 |
| JP | 09-031453 A | 2/1997 |
| JP | 09-185087 A | 7/1997 |
| JP | 09-211499 A | 8/1997 |
| JP | 09-230391 A | 9/1997 |
| JP | 10-048673 A | 2/1998 |
| JP | 10-149118 A | 6/1998 |
| JP | 10-161161 A | 6/1998 |
| JP | 11-212499 A | 8/1999 |
| JP | 11-219135 A | 8/1999 |
| JP | 11-237851 A | 8/1999 |
| WO | WO 82/02961 | 9/1982 |
| WO | WO 93/07000 | 4/1993 |
| WO | WO 95/33085 | 12/1995 |
| WO | WO 00/05704 | 2/2000 |
| WO | WO 00/36560 | 6/2000 |
| WO | WO 00/38000 | 6/2000 |
| WO | WO 00/67110 | 11/2000 |
| WO | WO 00/67327 | 11/2000 |
| WO | WO 01/07961 | 2/2001 |
| WO | WO 03/107315 | 12/2003 |

OTHER PUBLICATIONS

Amundson, K., et al., "Flexible, Active-Matrix Display Constructed Using a Microencapsulated Electrophoretic Material and an Organic-Semiconductor-Based Backplane", SID 01 Digest, 160 (Jun. 2001).

Anders, K., "Monodisperse Droplet Streams and Their Application in Space", Proc. Symp. Fluid Dynam., 1986, pp. 119-125.

Au, J. et al., "Ultra-Thin 3.1-in. Active-Matrix Electronic Ink Display for Mobile Devices", IDW'02, 223 (2002).

Bach, U., et al., "Nanomaterials-Based Electrochromics for Paper-Quality Displays", Adv. Mater, 14(11), 845 (2002).

Ballinger, D.O., "Magnetic recording paper is erasable", Electronics, Mar. 1, 1973, pp. 73-76.

Beilin, S., et al, "8.5: 2000-Character Electrophoretic Display", SID 86 Digest, 136 (1986).

Berglund et al., "Generation of Monodisperse Aerosol Standards", Environmental Science & Techology, vol. 7, No. 2, Feb. 1973, pp. 147-153.

(56) References Cited

OTHER PUBLICATIONS

Blazo, S.F., "High Resolution Electrophoretic Display with Photoconductor Addressing", SID Digest 1982, p. 152.
Behnke et al., "Polymer-Based Solid Electrochromic Cell for Matrix-Addressable Display Devices." J. Electrochem. Soc., 138, 3612 (1991).
Bouchard, A. et al., "High-Resolution Microencapsulated Electrophoretic Display on Silicon", SID 04 Digest, 651 (2004).
Brenn, G., et al., "A new apparatus for the production of monodisperse sprays at high flow rates", Chem. Eng. Sci., 52, 237 (1997).
Brenn, G., et al, "Monodisperse Sprays for Various Purposes—Their Production and Characteristics", Part. Part. Syst. Charact., 13, 179 (1996).
Bruce, C.A., "Dependence of Ink jet Dynamics on Fluid Characteristics", IBM J. Res. Develop., Dec. 5, 1975, pp. 258-270.
Bryce, M.R., "Seeing through synthetic metals", Nature, 335. 12 (1988).
Caillot, E. et al. "Active Matrix Electrophoretic Information Display for High Performance Mobile Devices", IDMC Proceedings (2003).
Chen, Y., et al., "A Conformable Electronic Ink Display using a Foil-Based a-Si TFT Array", SID 01 Digest, 157 (Jun. 2001).
Chiang, A., "Conduction Mechanism of Charge Control Agents Used in Electrophoretic Display Devices", Proceeding of the S.I.D., 18, 275 (1977).
Chiang, A., et al., "A High Speed Electrophoretic Matrix Display", SID 80 Digest (1980), 114.
Chiang, A., et al., "A Stylus Writable Electrophoretic Display Device", SID 79 Digest (1979), 44.
Comiskey, B., et al., "An electrophoretic ink for all-printed reflective electronic displays", Nature, 394, 253 (1998).
Comiskey, B., et al., "Electrophoretic Ink: A Printable Display Material", SID 97 Digest (1997), p. 75.
Croucher, M.D., et al., "Electrophoretic Display: Materials as Related to Performance", Photog. Sci. Eng., 25, 80 (1981).
Dabbousi, B.O., et al., "Electroluminescence from CdSe quantum-dot/polymer composites", Appl. Phys. Lett., 66, 1316 (1995).
Dabora, E.K., "Production of Monodisperse Sprays", The Review of Scientific Instruments, vol. 38, No. 4, Apr. 1967, pp. 502-506.
Dalisa, A., "Electrophoretic Display Technology", Proceedings of the SID (1977).
Danner, G.M. et al., "Reliability Performance for Microencapsulated Electrophoretic Displays with Simulated Active Matrix Drive", SID 03 Digest, 573 (2003).
Drzaic, P., et al., "A Printed and Rollable Bistabie Electronic Display", SID 98 Digest (1998), p. 1131.
Duthaler, G., et al., "Active-Matrix Color Displays Using Eiectrophoretic Ink and Color Filters", SID 02 Digest, 1374 (2002).
Duthaler, GM, "Design of a Drop-On-Demand Delivery System for Molten Solder Microdrops", Submitted to the Dept. of Mech. Eng. at MIT, Jan. 1995, pp. 1-73.
Egashira,. N., et al., "Solid electrochromic cell consisting of Lu-diphthalocyanine and lead fluoride", Proceedings of the SID, 28, 227 (1987).
Esen, C. et al., "Synthesis of Spherical Microcapsules by Photopolymerization in Aerosols", Colloid & Polymer Science, vol. 275, No. 2, 1997, pp. 131-137.
Fitzhenry, B., "Optical effects of adsorption of dyes on pigment used in electrophoretic image displays", Appl. Optics., 18, 3332 (1979).
Fitzhenry-Ritz, B., "Optical Properties of Electrophoretic Image Displays", Proceedings of the S.I.D., 22, 300 (1981).
Franjinone et al., "The Art and Science of Microencapsulation", Technology Today, 1995, no page numbers.
Ganan-Calvo, A.M., "Generation of Steady Liquid Microthreads and Micron-Sized Monodisperse Sprays in Gas Streams", Phys. Rev. Lett., 80, 285 (1998).
Goodman, L.A., Passive Liquid Displays: Liquid Crystals, Electrophoretics and Electrochromics, Proceedings of S.I.D., 17, 30 (1976).

Gutcho, M.H., Microcapsules and Microencapsulation Techniques, Noyes Data Corp., Park Ridge NJ, (1976).
Hatano, T., et al., "18:3: Bistable Paper-White Display Device Using Cholesteric Liquid Crystals", SID 96 Digest, 269 (1996).
Heinzl, J., et al., "Ink-Jet Printing", Advances in Electronics and Electron Physics, 65, 91 (1985).
Henzen, A. et al., "An Electronic Ink Low Latency Drawing Tablet", SID 04 Digest, 1070 (2004).
Henzen, A. et al., "Development of Active Matrix Electronic Ink Displays for Handheld Devices", SID 03 Digest, 176, (2003).
Henzen, A. et al., "Development of Active Matrix Electronic Ink Displays for Smart Handheld Applications", IDW'02, 227 (2002).
Huang, J., et al., "Photoluminescence and electroluminescence of ZnS:Cu nanocrystals in polymeric networks", Appl. Phys. Lett., 70, 2335 (1997).
Jacobson, J., et al., "The last book", IBM Systems J., 36, 457 (1997).
Ji. Y., et al., "P-50: Polymer Walls in Higher-Polymer-Content Bistable Reflective Cholesteric Displays", SID 96 Digest, 611 (1996).
Jin et al., "Optically Transparent, Electrically Conductive Composite Medium", Science, 255, 446 (1992).
Jo, G-R, et al., "Toner Display Based on Particle Movements", Chem. Mater, 14, 664 (2002).
Kazlas, P. et al., "Card-size Active-matrix Electronic Ink Display", Eurodisplay 2002, 259 (2002).
Kazlas, P., et al., "12.1" SVGA Microencapsulated Electrophoretic Active Matrix Display for Information Applicances", SID 01 Digest, 152 (Jun. 2001).
Kitamura, T., et al., "Electrical toner movement for electronic paper-like display", Asia Display/IDW '01, p. 1517, Paper HCS1-1 (2001).
Lee, L.L., "Fabrication of Magnetic Particles Displays", Proceedings of the SID, 18, 283 (1977).
Lewis et al., "Gravitational, Inter-Particle and Particle-Electrode Forces in the Electrophoretic Display", Proceedings of the SID, 18, 235 (1977).
Lin et al., "Vibrating Orifice Droplet Generator for Precision Optical Studies", Rev. Sci. Instrum, vol. 61, No. 3, Mar. 1990, pp. 1018-1023.
Mansson, A., "Investigation of Electrically Charged Liquid Jets", Physica Scripta 4, Nov. 11, 1971, pp. 221-226.
Matsumoto et al., "A Production Process for Uniform-Size Polymer Particles", Journal of Chemical Engineering of Japan, vol. 22, No. 6, 1989, pp. 691-694.
Matsumoto et al., "Design Criteria of Hollow Cone Nozzle and Prediciton of Drop Size Distribution", Proc. of 1st International Conference of Liquid Atomization and Spray Systems, 1978, pp. 79-84.
Matsumoto et al., "Production of Monodispersed Capsules", J. Microencapsulation, vol. 3, No. 1, 1986, pp. 25-31.
Matsumoto, S., et al., "Generation of Monodispersed Concentric Two Phase Droplets for Encapsulation," ICLASS—'82, Reports & Proc, 2nd Int. Conf. on Liquid Atomization & Spray Systems, pp. 63-67 (1982).
McCarthy et al., "Review of Stability of Liquid Jets and Influence of Nozzle Design", The Chemical Engineering Journal, vol. 7, 1974, pp. 1-20.
Murau, P., et al., "An Electrophoretic Radiographic Device", SID 79 Digest, (1979) pp. 46-47.
Murau, P., et al., "The understanding and elimination of some suspension instabilities in an electrophoretic display", J. Appl. Phys., 49, 4820 (1978).
Nakamura, E., et al., "Development of Electrophoretic Display Using Microcapsulated Suspension," SID 98 Digest (1998), p. 1014.
Negroponte, N., et al., "Surfaces and Displays," Wired, Jan. 1997, p. 212.
O'Regan, B. et al., "A Low Cost, High-efficiency Solar Cell Based on Dye-sensitized colloidal TiO2 Films", Nature, vol. 353, Oct. 24, 1991, 773-740.
Orme et al., "Droplet Patterns from Capillary Stream Breakup", Phys. Fluids, vol. 5, No. 1, Jan. 1993, pp. 80-90.
Orme et al., "New Technique for Producing Highly Uniform Droplet Streams Over an Extended Range of Disturbance Wavenumbers", Rev. Sci. Instrum., vol. 58, No. 2, Feb. 1987, pp. 279-284.

(56) References Cited

OTHER PUBLICATIONS

Orme et al., "The Manipulation of Capillary Stream Breakup Using Amplitude Modulated Disturbances: A Pictorial and Quantitative Representation", Phys. Fluids, vol. 2, No. 7, Jul. 1990, pp. 1124-1140.
Ota, I., et al., "Developments in Electrophoretic Displays", Proceedings of the SID, 18, 243 (1977).
Ota, I., et al., "Electrophoretic display devices", Laser 75 Optoelectronics Conference Proceedings, 145 (1975).
Ota, I., et al., "Electrophoretic Image Display (EPID) Panel", Proceedings of the IEEE, 61, 832 (1973).
Pankove, "Color Reflection Type Display Panel", RCA Technical Notes, Mar. 1962, No. 535.
Pansu, B., et al., "Structures of Thin Layers of Hard Spheres: High Pressure Limit," J. Physique, 45, 331 (1984).
Pansu, B., et al., "Thin colloidal drystals: a series of structural transitions," J. Physique, 44, 531 (1983).
Park et al., "A Device for Producing Controlled Collisions Between Pairs of Drops", Chemical Engineering Science, vol. 20, pp. 39-45.
Pearlstein, "Electroless Plating", in Lowenheim (ed.), Modern Electroplating, Wiley, New York (1976), pp. 710-747.
Peiranski, P., et al., "Thin Colloidal Crystals," Phys. Rev. Lett., 50, 900 (1983).
Peterson, I., "Rethinking Ink: Printing the Pages of an Electronic Book," Science News, 153, 396 (Jun. 20, 1998).
Pitt, M.G., et al., "Power Consumption of Microencapsulated Electrophoretic Displays for Smart Handheld Applications", SID 02 Digest, 1378 (2002).
Rayleigh, Lord F.R.S., "On the Instability of Jets", Proc. London Math Soc., vol. 10, pp. 4-13 (1879).
Ridley, B.A. et al., "All-Inorganic Field Effect Transistors by Printing," Science, 286, 746 (1999).
Saitoh, M., et al., "A newly developed electrical twisting ball display", Proceedings of the SID, 23, 249 (1982).
Sankus, "Electrophoretic Display Cell", Xerox Disclosure Journal, 6(3), 309 (1979).
Scheller et al., "Viscous Jet Breakup: Nonsinusoidal Disturbances", Chem. Eng. Comm., vol. 107, 1991, pp. 35-53.
Schummer et al., "Production of Monodispersed Drops by Forced Disturbance of a Free Jet", Ger. Chem. Eng., vol. 5, 1982, pp. 209-220.
Sheridon, N.K., et al., "The Gyricon—A Twisting Ball Display", Proceedings of the SID, 18, 289 (1977).
Shiffman, R.R., et al., "An Electrophoretic Image Display with Internal NMOS Address Logic and Display Drivers," Proceedings of the SID, 1984, vol. 25, 105 (1984).
Shimoda et al., "Multicolor Pixel Patterning of Light-Emitting Polymers by Ink-Jet Printing", SID 99 Digest, 376 (1999).
Shiwa, S., et al., "Electrophoretic Display Method Using Ionographic Technology," SID 88 Digest (1988), p. 61.
Singer, B., et al., "An X-Y Addressable Electrophoretic Display," Proceedings of the SID, 18, 255 (1977).
Slocum, A.H., "Kinematic Coupling Design", in Precision Machine Design, Prentice Hall 1992, pp. 401-412.
Tjahjadi et al. ., "Satellite and Subsatellite Formation in Capillary Breakup", The Journal of Fluid Mechanics, vol. 243, 1992, pp. 297-317.
Van Winkle, D.H., et al., "Layering Transitions in Colloidal Crystals as Observed by Diffraction and Direct-Lattice Imaging", Phys. Rev. A, 34, 562 (1986).
Vance, D.W., "Optical Characteristics of Electrophoretic Displays", Proceedings of the SID, 18, 267 (1977).
Vandegaer, J.E. (ed.), "Microencapsulation Processes and Applications", pp. v-x, 1-180 (Plenum Press, New York 1974).
Vaz, N.A., et al., "Dual-frequency addressing of polymer-dispersed liquid-crystal films", J. Appl. Phys., 65, 5043 (1989).
Webber, R., "Image Stability in Active-Matrix Microencapsulated Electrophoretic Displays", SID 02 Digest, 126 (2002).
White, F.M., Fluid Mechanics, 1997, pp. 351-369.
White, R., "An Electrophoretic Bar Graph Display," Proceedings of the SID, 22, 173 (1981).
Whitesides and Ross, J. Interface Colloid Sci. 196, 48-59 (1995).
Whitesides, T. et al., "Towards Video-rate Microencapsulated Dual-Particle Electrophoretic Displays", SID 04 Digest, 133 (2004).
Wood, D., "An Electrochromic Renaissance?" Information Display, 18(3), 24 (Mar. 2002).
Yamaguchi, M., et al., "Equivalent Circuit of Ion Projection-Driven Electrophoretic Display," IEICE Transactions, 74, 4152 (1991).
Yamaguchi, Y., et al., "Toner display using insulative particles charged triboelectrically", Asia Display/IDW '01, p. 1729, Paper AMD4-4 (2001).
Yang, Y., et al., "A new architecture for polymer transistors", Nature, 372, 344 (1994).
Zehner, R. et al., "Drive Waveforms for Active Matrix Electrophoretic Displays", SID 03 Digest, 842 (2003).
Zollinger, "Structure of Simple Di- and Triarylmethine Dyes and their Aza Analogues," in Color Chemistry: Synthesis, Properties and Applications of Organic Dyes and Pigments, 2nd, Rev. Edition, VCH, Weinheim, 1991, p. 71-86.
Zurer, P., "Digital Ink Brings Electronic Books Closer," Chemical and Engineering News, Jul. 20, 1998, p. 12.

\* cited by examiner

PREPARATION OF CAPSULES

REFERENCE TO RELATED APPLICATIONS

This application is a continuation of application Ser. No. 10/905,746, filed Jan. 19, 2005 (Publication No. 2005/0156340), which itself claims benefit of Provisional Application Ser. No. 60/481,920, filed Jan. 20, 2004, and Provisional Application Ser. No. 60/521,010, filed Feb. 5, 2004.

The entire contents of these applications, and of all other U.S. patents and published and copending applications referred to below are also herein incorporated by reference.

BACKGROUND OF INVENTION

This invention relates to the preparation of capsules, especially capsules intended for use in forming electrophoretic media.

Particle-based electrophoretic displays, in which a plurality of charged particles move through a suspending fluid under the influence of an electric field, have been the subject of intense research and development for a number of years. Such displays can have attributes of good brightness and contrast, wide viewing angles, state bistability, and low power consumption when compared with liquid crystal displays.

(The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in published U.S. Patent Application No. 2002/0180687 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.)

Nevertheless, problems with the long-term image quality of electrophoretic displays have prevented their widespread usage. For example, particles that make up electrophoretic displays tend to settle, resulting in inadequate service-life for these displays.

Numerous patents and applications assigned to or in the names of the Massachusetts Institute of Technology (MIT) and E Ink Corporation have recently been published describing encapsulated electrophoretic media. Such encapsulated media comprise numerous small capsules, each of which itself comprises an internal phase containing electrophoretically-mobile particles suspended in a liquid suspending medium, and a capsule wall surrounding the internal phase. Typically, the capsules are themselves held within a polymeric binder to form a coherent layer positioned between two electrodes. Encapsulated media of this type are described, for example, in U.S. Pat. Nos. 5,930,026; 5,961,804; 6,017,584; 6,067,185; 6,118,426; 6,120,588; 6,120,839; 6,124,851; 6,130,773; 6,130,774; 6,172,798; 6,177,921; 6,232,950; 6,249,271; 6,252,564; 6,262,706; 6,262,833; 6,300,932; 6,312,304; 6,312,971; 6,323,989; 6,327,072; 6,376,828; 6,377,387; 6,392,785; 6,392,786; 6,413,790; 6,422,687; 6,445,374; 6,445,489; 6,459,418; 6,473,072; 6,480,182; 6,498,114; 6,504,524; 6,506,438; 6,512,354; 6,515,649; 6,518,949; 6,521,489; 6,531,997; 6,535,197; 6,538,801; 6,545,291; 6,580,545; 6,639,578; 6,652,075; 6,657,772; 6,664,944; 6,680,725; 6,683,333; 6,704,133; 6,710,540; 6,721,083; 6,727,881; 6,738,050; 6,750,473; 6,753,999; 6,816,147; 6,819,471; 6,822,782; 6,825,068; 6,825,829; 6,825,970; 6,831,769; and 6,839,158; and U.S. Patent Applications Publication Nos. 2002/0060321; 2002/0063661; 2002/0090980; 2002/0113770; 2002/0130832; 2002/0131147; 2002/0171910; 2002/0180687; 2002/0180688; 2003/0011560; 2003/0020844; 2003/0025855; 2003/0102858; 2003/0132908; 2003/0137521; 2003/0151702; 2003/0214695; 2003/0214697; 2003/0222315; 2004/0008398; 2004/0012839; 2004/0014265; 2004/0027327; 2004/0075634; 2004/0094422; 2004/0105036; 2004/0112750; 2004/0119681; and 2004/0196215; and International Applications Publication Nos. WO 99/67678; WO 00/05704; WO 00/38000; WO 00/38001; WO00/36560; WO 00/67110; WO 00/67327; WO 01/07961; WO 01/08241; WO 03/107,315; WO 2004/023195; WO 2004/049045; WO 2004/059378; WO 2004/088002; WO 2004/088395; WO 2004/090857; and WO 2004/099862.

Known electrophoretic media, both encapsulated and unencapsulated, can be divided into two main types, referred to hereinafter for convenience as "single particle" and "dual particle" respectively. A single particle medium has only a single type of electrophoretic particle suspended in a suspending medium, at least one optical characteristic of which differs from that of the particles. (In referring to a single type of particle, we do not imply that all particles of the type are absolutely identical. For example, provided that all particles of the type possess substantially the same optical characteristic and a charge of the same polarity, considerable variation in parameters such as particle size and electrophoretic mobility can be tolerated without affecting the utility of the medium.) When such a medium is placed between a pair of electrodes, at least one of which is transparent, depending upon the relative potentials of the two electrodes, the medium can display the optical characteristic of the particles (when the particles are adjacent the electrode closer to the observer, hereinafter called the "front" electrode) or the optical characteristic of the suspending medium (when the particles are adjacent the electrode remote from the observer, hereinafter called the "rear" electrode (so that the particles are hidden by the suspending medium).

A dual particle medium has two different types of particles differing in at least one optical characteristic and a suspending fluid which may be uncolored or colored, but which is typically uncolored. The two types of particles differ in electrophoretic mobility; this difference in mobility may be in polarity (this type may hereinafter be referred to as an "opposite charge dual particle" medium) and/or magnitude. When such a dual particle medium is placed between the aforementioned pair of electrodes, depending upon the relative potentials of the two electrodes, the medium can display the optical characteristic of either set of particles, although the exact manner in which this is achieved differs depending upon whether the difference in mobility is in polarity or only in magnitude. For ease of illustration, consider an electrophoretic medium in which one type of particles is black and the other type white. If the two types of particles differ in polarity (if, for example, the black particles are positively charged and the white particles negatively charged), the particles will be attracted to the two different electrodes, so that if, for example, the front electrode is negative relative to the rear electrode, the black particles will be attracted to the front electrode and the white particles to the rear electrode, so that the medium will appear black to the observer. Conversely, if the front electrode is positive relative to the rear electrode, the white particles will be attracted to the front electrode and the black particles to the rear electrode, so that the medium will appear white to the observer.

If the two types of particles have charges of the same polarity, but differ in electrophoretic mobility (this type of medium may hereinafter to referred to as a "same polarity dual particle" medium), both types of particles will be attracted to the same electrode, but one type will reach the electrode before the other, so that the type facing the observer differs depending upon the electrode to which the particles are attracted. For example suppose the previous illustration is modified so that both the black and white particles are positively charged, but the black particles have the higher electrophoretic mobility. If now the front electrode is negative relative to the rear electrode, both the black and white particles will be attracted to the front electrode, but the black particles, because of their higher mobility will reach it first, so that a layer of black particles will coat the front electrode and the medium will appear black to the observer. Conversely, if the front electrode is positive relative to the rear electrode, both the black and white particles will be attracted to the rear electrode, but the black particles, because of their higher mobility will reach it first, so that a layer of black particles will coat the rear electrode, leaving a layer of white particles remote from the rear electrode and facing the observer, so that the medium will appear white to the observer: note that this type of dual particle medium requires that the suspending fluid be sufficiently transparent to allow the layer of white particles remote from the rear electrode to be readily visible to the observer. Typically, the suspending fluid in such a display is not colored at all, but some color may be incorporated for the purpose of correcting any undesirable tint in the white particles seen therethrough.

Both single and dual particle electrophoretic displays may be capable of intermediate gray states having optical characteristics intermediate the two extreme optical states already described.

Some of the aforementioned patents and published applications disclose encapsulated electrophoretic media having three or more different types of particles within each capsule. For purposes of the present application, such multi-particle media are regarded as sub-species of dual particle media.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned 2002/0131147. Accordingly, for purposes of the present application, such polymer-dispersed electrophoretic media are regarded as sub-species of encapsulated electrophoretic media.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, the aforementioned U.S. Pat. Nos. 6,130,774 and 6,172,798, and U.S. Pat. Nos. 5,872,552; 6,144,361; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode.

An encapsulated or microcell electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition; and other similar techniques.) Thus, the resulting display can be flexible. Further, because the display medium can be printed (using a variety of methods), the display itself can be made inexpensively.

The preferred process for preparing electrophoretic capsules described in the aforementioned E Ink and MIT patents and applications uses a gelatin/acacia coacervate as the encapsulation material, and the process for forming such gelatin/acacia capsules may be summarized as follows; see, for example, the aforementioned 2002/0180687, Paragraphs [0069] to [0074]. An internal phase is prepared containing one or more types of electrophoretic particles in a suspending fluid; typically, the internal phase comprises titania and carbon black particles in an uncolored hydrocarbon suspending fluid. The internal phase is thoroughly stirred to ensure that it is homogeneous. Gelatin is dissolved in deionized water at a temperature of 40° C., and vigorously stirred. The internal phase, heated to the same temperature, is added dropwise to the stirred gelatin solution through a tube the outlet of which is below the surface of the stirred solution. The resultant mixture is held at 40° C. with continued vigorous stirring to produce a dispersion of droplets of the internal phase in a continuous gelatin-containing aqueous phase.

A solution of acacia in water at 40° C. is then added to the mixture, and the pH of the mixture is lowered to approximately 4.9 to cause formation of the gelatin/acacia coacervate, thereby forming capsules. The temperature of the resultant mixture is then lowered to 10° C. and an aqueous solution of glutaraldehyde (an agent for cross-linking the capsule walls) is added. The resultant mixture is then warmed to 25° C. and stirred vigorously for a further 12 hours.

The capsules produced are separated from the liquid and washed by redispersion in water. The capsules are then separated by size by sieving or otherwise. For reasons explained in several of the aforementioned E Ink and MIT patents, it is desirable that an encapsulated electrophoretic medium comprises a single, substantially close-packed layer of capsules. Also, when such an electrophoretic medium is produced by coating capsules on to a substrate, it is desirable that the exposed surface of the capsule layer be reasonably flat, since otherwise difficulties may be encountered in laminating the capsule layer to other layers in the final display. Production of such a substantially close-packed layer with a reasonably flat exposed surface is best achieved by coating capsules which are of substantially the same size. Typically, the desired range of capsule diameters will be 30-50 μm, with an average of 40 μm.

Unfortunately, it has been found that the prior art encapsulation process described above does not produce a high yield of capsules with the desired range of diameters. Typically, the yield of the desired capsules (measured as volume percent of the total capsules produced) ranges from 12 to 34 percent, with an average of about 27 percent. Although the average capsule diameter can be varied over a considerable range by controlling parameters such as gelatin concentration, stirring rate, etc., it has not proved possible to increase yields above this range, the major problem being the high proportion of "fines" or capsules having diameters below the acceptable range; for example, as shown in the Example below, in a typical optimized prior art process designed to produce 30-50 μm capsules, the volume percent capsules actually peaks at about 10-12 μm. Obviously such low yields of useful capsules are a major problem, since they greatly increase the cost of the electrophoretic medium and generate substantial costs for disposing of the unacceptable capsules. The prior art process is also not easily scalable, requiring re-optimization each time the size and/or shape of the reactor is changed.

The present invention provides two different approaches to overcoming the aforementioned disadvantages of the prior art encapsulation process, and thus substantially increasing the yield of useful capsules. The first approach involves a relatively straightforward modification of the prior art process in which the coacervate is first formed and thereafter the material to be encapsulated is emulsified in this coacervate phase. The second approach represents a more fundamental change in the process using a limited coalescence ("LC") process.

Techniques for capsule formation other than stirring of one phase into another are known. One group of such techniques, which have been developed primarily for the preparation of droplets of monomer for use in suspension polymerization processes, are limited coalescence processes; in such processes, the increased particle size uniformity and suspension volume fraction provided by limited coalescence processes allow more efficient use of equipment. There is an extensive patent literature regarding such processes; see, for example, U.S. Pat. Nos. 4,965,131 and 2,932,629.

Limited coalescence processes involves the use of so-called Pickering emulsions for the stabilization of droplets at the critical stage of the process. Pickering emulsions are emulsions (either oil-in-water or water-in-oil) stabilized against coalescence by surface-active particulate materials (also referred to as "particulate colloids" or "PC's"), rather than, as in the case of most conventional emulsions, small surfactant molecules or surface-active soluble polymers. Typical surface-active particulate materials include clay particles, colloidal silica dispersions, and lightly cross-linked latex particles, though many other materials have also been used. Since most of these materials are not intrinsically surface active (that is, they will not partition specifically to an oil-water interface), a second component, called a promoter, is required to achieve stable Pickering emulsions. Promoters are typically themselves somewhat surface active; examples include amphiphilic species of many types, including typical surfactants (soaps, alkyl sulfonates, alkyl ammonium salts, and the like), as well as soluble polymers (gelatin, poly(vinylpyrrolidone), poly(ethylene oxide), poly(vinyl alcohol), etc.) and oligomers (e.g., the condensation product of alkylaminoethanol and adipic acid and similar species as described in the aforementioned patents). The promoter is believed to function by adsorbing on the surface-active particulate material, thus rendering it surface active at the oil-water interface. The amount of promoter is therefore very important, since good promoters are generally materials that will destabilize the PC. If too little promoter is present, the surface-active particulate material will not adsorb at the oil-water interface, and the oil droplets will not acquire stability; however, if too much promoter is present, the surface-active particulate material will either coagulate and separate from the suspension, or partition into the oil phase. A large excess of promoter is, in many cases, capable of stabilizing a conventional emulsion at the expense of a Pickering emulsion. In each of these cases, the result is failure of the limited coalescence process, which requires the formation of a stable Pickering emulsion.

In a typical limited coalescence process, an oil phase is suspended in an aqueous suspension comprising water, surface-active particulate material, and promoter. The resulting crude emulsion is then homogenized under conditions expected to yield a very small particle-sized oil-in-water emulsion. This emulsion is unstable, because the small size of the particles makes the oil-water interfacial area very much larger than that which can be covered by the limited amount of surface-active particulate material present. Coalescence therefore occurs, with a concomitant reduction in interfacial area. As this area decreases, the fraction of the interfacial area covered by adsorbed particulate material increases, and as this fraction approaches 1 (complete coverage) coalescence stops (hence the term "limited coalescence" for the process as a whole). The process has been studied theoretically and mechanistically (see, for example, Whitesides and Ross, J. Interface Colloid Sci. 196, 48-59 (1995)). Monte Carlo simulations have shown that, with reasonable assumptions concerning the probability that collision between droplets will result in coalescence (in particular that the probability of coalescence is a decreasing function of the fractional coverage of the interface by the particulate material), the final droplet particle size distribution will be quite narrow. It is found that the volume of the largest droplets will be approximately twice the volume of the smallest, so that the particle diameters vary by only about the cube root of 2 (approximately 1.26). The best limited coalescence processes match this expectation well.

As already mentioned, limited coalescence processes have primarily been developed for the preparation of droplets of monomer for use in suspension polymerization processes, and there are a number of problems with applying such processes in other contexts. Firstly, a particulate colloidal stabilizer must be found that is compatible with the particular system in which it is to be used. Secondly, the oil-in-water emulsion formed during homogenization must be unstable with respect to coalescence, and this requires that any surfactants already present in the system must be rendered ineffective.

It has now been found that these problems can be overcome and limited coalescence processes used successfully for the production of capsules for use in electrophoretic displays with substantially improved yields as compared with the prior art capsule production processes described above.

SUMMARY OF INVENTION

Accordingly, in one aspect this invention provides a process for encapsulating a water-immiscible phase in a protein coacervate, the process comprising:

forming a coacervate of the protein and a coacervating agent in an aqueous medium; and emulsifying the water-immiscible phase in the aqueous medium comprising the coacervate under conditions effective to cause deposition of the coacervate around the water-immiscible phase, thereby forming capsules of the water-immiscible phase surrounded by capsule walls of the coacervate.

This process may hereinafter be called the "preformed coacervate" process of the present invention. In this process, the protein may be gelatin and the coacervating agent may be acacia. The water-immiscible phase may comprise an aliphatic hydrocarbon.

As already indicated, the preformed coacervate process of the invention is especially, though not exclusively, intended for use in producing capsules for electrophoretic media. In this application, the water-immiscible phase used in the process normally comprises the complete internal phase (electrophoretic particles and suspending fluid, plus any additives desired in or on either the fluid or the particles) of the electrophoretic medium. Such an internal phase may be of any of the types known to be useful in electrophoretic media. Thus, in the preformed coacervate process of the invention the hydrocarbon may have solid particles suspended therein, and these solid particles may be electrically charged. In a preferred form of the process, intended for the production of an opposite charge dual particle electrophoretic medium as described above, the water-immiscible phase comprises two different types of solid particles bearing charges of opposite polarity.

For reasons explained in detail below, it is desirable that at least part of the emulsification/capsule formation step take place at a temperature close to the gelation temperature of the aqueous medium; thus, typically at least part of the emulsification/capsule formation step should take place below about 35° C.

Once the capsules have been formed in the preformed coacervate process have been formed, they may be treated with a cross-linking agent effective to cause cross-linking of the protein. This cross-linking agent may be an aldehydes, for example glutaraldehyde. Also, as described in several of the aforementioned E Ink and MIT patents and applications, the capsules formed may thereafter be mixed with a polymeric binder and the capsules/binder mixture coated on to a substrate and dried to form a coherent layer of capsules on the substrate.

In another aspect, this invention provides a process for encapsulating a water-immiscible phase in a protein coacervate, the process comprising:
forming an aqueous phase comprising a colloidal alumina suspension and a promoter; emulsifying the water-immiscible phase in the aqueous phase under conditions effective to cause the formation of an unstable emulsion comprising small droplets of the water-immiscible phase in the aqueous phase; and
admixing the emulsion with the protein and a coacervating agent under conditions permitting coalescence of the emulsion and the formation of capsules of the aqueous phase surrounded by capsule walls of the coacervate.

This process may hereinafter be called the "limited coalescence" or "LC" process of the present invention. In this process, the alumina may comprise from about 0.1 to about 1.0 percent by weight of the aqueous phase. The promoter may comprise a polyacid, for example a copolymer of a carboxylic acid and an olefin. The protein may comprise gelatin, and the coacervating agent may comprise an anionic polymer. Such an anionic polymer may comprise a polyanionic polymer having a vinyl main chain and a plurality of anionic groups bonded to the main chain; thus, for example, the polyanionic polymer may comprise any one or more of poly(acrylic acid); poly(methacrylic acid); copolymers of poly(acrylic acid) and/or poly(methacrylic acid) with esters of the same acids; styrene sulfonate copolymers with styrene; methyl vinyl ether or vinyl acetate copolymers with (meth)acrylic acid; copolymers of alkyl-substituted olefins, methyl vinyl ether and vinyl carboxylate with maleic acid, maleic esters, and maleic half ester, half acids.

As already indicated, the LC process of the invention is especially, though not exclusively, intended for use in producing capsules for electrophoretic media. In this application, the water-immiscible phase used in the process normally comprises the complete internal phase (electrophoretic particles and suspending fluid, plus any additives desired in or on either the fluid or the particles) of the electrophoretic medium. Such an internal phase may be of any of the types known to be useful in electrophoretic media. Thus, in the LC process of the invention the water-immiscible phase may comprise a hydrocarbon, which may have solid particles suspended therein, and these solid particles may be electrically charged. In a preferred form of the process, intended for the production of an opposite charge dual particle electrophoretic medium as described above, the water-immiscible phase comprises two different types of solid particles bearing charges of opposite polarity. For reasons explained below, the hydrocarbon may also have dispersed therein a di-block copolymer or an aromatic-substituted alkene and an alkene.

As in the preformed coacervate process of the invention, in the LC process the capsules formed may thereafter be treated with a cross-linking agent effective to cause cross-linking of the protein. This cross-linking agent maybe an aldehydes, for example glutaraldehyde. The capsules formed may thereafter be mixed with a polymeric binder and the capsules/binder mixture coated on to a substrate and dried to form a coherent layer of capsules on the substrate.

DETAILED DESCRIPTION

Figure 1:
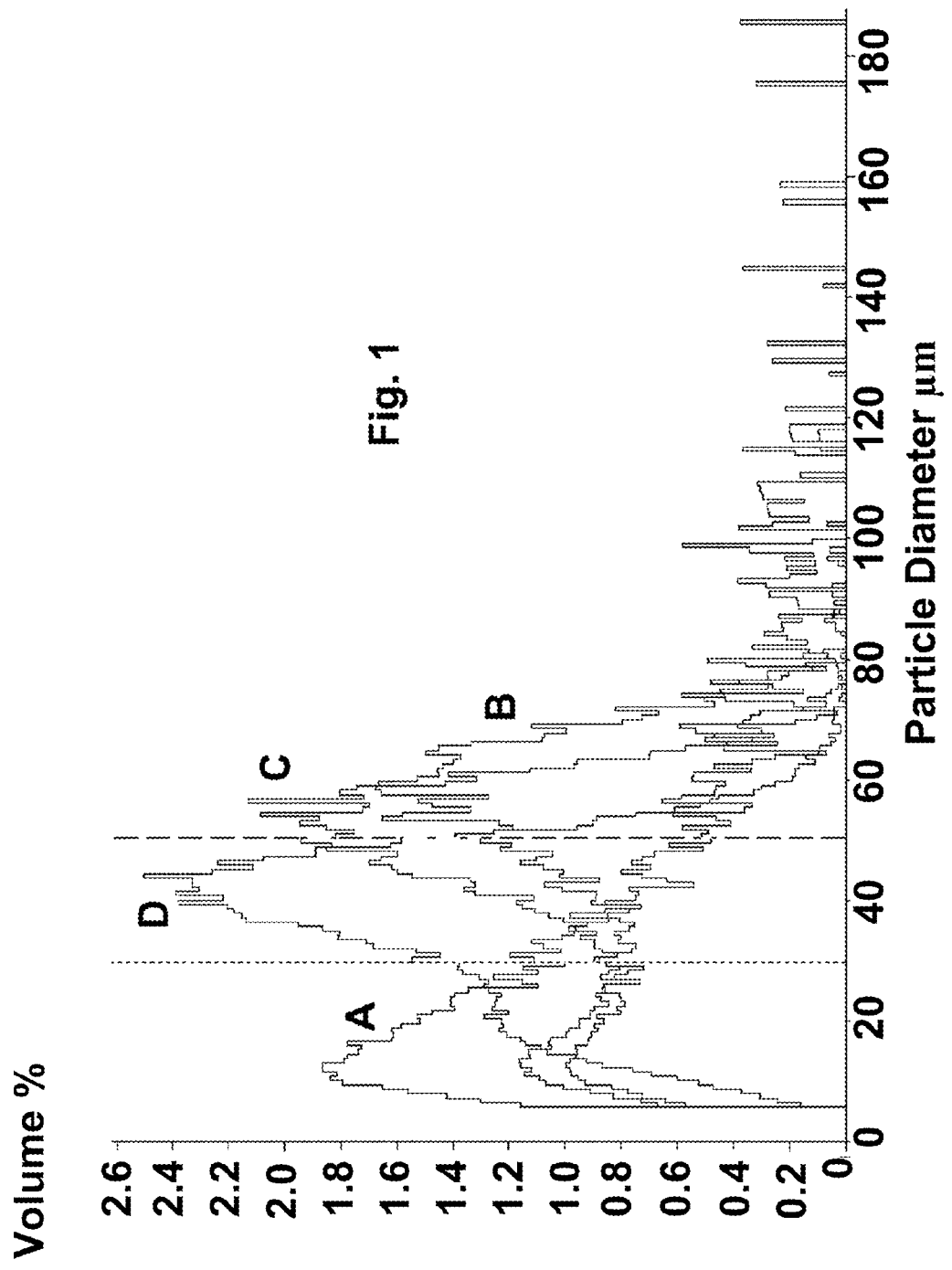
FIG. 1 of the accompanying drawings is a graph showing the size distributions of capsules obtained from three preformed coacervate processes of the present invention and a control process in the experiments described in Example 1 below.

As already mentioned, the present invention provides two different processes intended to overcome the disadvantages of prior art encapsulation processes described above, namely the preformed coacervate and limited coalescence processes of the present invention. Accordingly, after an introduction describing the common features of the two processes, the details of each process will be discussed separately.

As will readily be apparent to those skilled in encapsulation technology, the present invention relates only to the encapsulation step of what is normally a multi-step process for the production of the final encapsulated material. Thus, except for those aspects of material selection and processing specific to the encapsulation processes of the invention, as discussed below, the material, processes and techniques used in association with the present processes may be any of those known in the art. For example, as already indicated, the processes of the present invention are especially but not exclusively intended for use in the production of encapsulated electrophoretic media, and when the present processes are being used for this purpose, the electrophoretic particles, the suspending fluid and any additives (for example, charge control agents)) included in the internal (water-immiscible phase) may be any of those described in the aforementioned E Ink and MIT patents and applications, provided of course that the materials chosen are compatible with the specific materials used in the encapsulation process. Similarly, the "post-processing" steps required to convert the capsules formed by the present processes to a finished electrophoretic medium may be any of those described in the aforementioned E Ink and MIT patents and applications, since the physical properties of capsules produced by the present processes are generally similar to those produced by the prior art processes.

The present processes are, not, however, confined to the production of capsules for use in electrophoretic media, but may be used for the encapsulation of other water-immiscible phases. For example, the present processes may be useful for the encapsulation of materials to be used in carbonless copying systems or pharmaceuticals dissolved in organic solvents.

Preformed Coacervate Process

As already mentioned, the preformed coacervate process of the present invention is a process for encapsulating a water-immiscible phase in a protein coacervate. This process comprises forming a coacervate of the protein and a coacervating agent in an aqueous medium; and emulsifying the water-immiscible phase in the aqueous medium comprising the coacervate under conditions effective to cause deposition of the coacervate around the water-immiscible phase, thereby forming capsules of the water-immiscible phase surrounded by capsule walls of the coacervate. Thus, in this process, a protein coacervate phase is first formed, and thereafter a hydrocarbon internal phase (or other water-immiscible phase which it is desired to encapsulate) is emulsified in this coacervate phase to form capsules. It has been found that emulsifying the internal phase in the coacervate phase, rather than emulsifying the internal phase in an aqueous phase containing protein but no coacervating agent and then adding the coacervating agent to form the coacervate, substantially reduces the proportion of fines in the final capsules, and produces a sharper peak in the volume percent capsules against capsule diameter curve. The combination of these two effects substantially increases the yield of useful capsules; as shown in the Example below, yields of capsules in the desired 30-50 μm range exceeding 50 percent have been achieved.

The reduction in the proportion of fines achieved by the preformed coacervation process is surprising, since it is directly contrary to what would be expected from commonly accepted fluid mechanics theory. The preformed coacervate phase used in this process has of course a substantially higher viscosity than the protein-only aqueous phase used in the prior art processes discussed above, and fluid mechanics theory predicts that this increased viscosity will result in a more efficient transfer of shear from the impeller used for the vigorous stirring of the reaction mixture, thus resulting in an increased proportion of fines at the same stirring rate, or production of the same sized capsules at a lower stirring rate. However, empirically it has been found that the exact opposite occurs; a substantially increased stirring rate (about 30-35 percent greater) is needed in the present process to produce the same mean capsule size, and substantially fewer fines are produced.

It has also been found that, to secure capsules with optimum mechanical properties, it is important to control the temperature at which the preformed coacervate process is conducted. More specifically, it has been found desirable to ensure that at least the last part of the encapsulation process, prior to the normal cross-linking of the capsules, is conducted at a temperature close to but above the gelation temperature of the aqueous medium. It has been found that use of such a temperature close to the gelation temperature increases the wall thickness and the mechanical robustness of the final capsules. In practice, when a gelatin coacervate is being produced, the gelation temperature is typically close to 30° C., so at least part of the encapsulation process should be conducted at a temperature below about 35° C.

At least when a gelatin/acacia coacervate is being used, it has been found desirable to maintain the proportions of gelatin and acacia in the preformed coacervate solution somewhat higher than in the prior art processes discussed above. The preferred process described in several of the aforementioned E Ink and MIT patents and applications begins with a gelatin concentration of about 2.4 percent by weight; in contrast, it has been found that typically the optimum concentration of gelatin and acacia in a preformed coacervate solution is about 3.2 percent by weight of each component. After the emulsification of the water-immiscible phase in the preformed coacervate has been completed, it has been found desirable to add additional water to reduce the gelatin and acacia concentrations to about 2.4 percent by weight in the later stages of the process.

The following Example is now given, though by way of illustration only, to show the improved capsule yields which can be achieved by the preformed coacervate process of the present invention.

EXAMPLE 1

An internal phase was prepared substantially as described in the aforementioned 2002/0180687, this internal phase comprising polymer-coated titania and polymer-coated carbon black in a hydrocarbon solvent. This internal phase was then encapsulated by both a prior art ("PA") process and a preformed coacervate process ("PC") of the present invention. The material amounts given for the PC process are for a scaled down volume of 75%, based on water and oil amounts, of the original PA process. The material and amounts used for the two encapsulations were are shown in Table 1 below:

TABLE 1

| Material | PA | PC |
| --- | --- | --- |
| Deionized water | 32776 | 18437 |
| Gelatin | 667 | 300 |
| Makeup water | 0 | 6145 |
| Acacia | 667 | 300 |
| Internal Phase | 10700 | 8025 |
| Glutaraldehyde | 167 | 87.7 |

The encapsulations were performed in a 50 L reactor provided with a propeller type stirrer. The prior art process was carried out substantially as described in the aforementioned 2002/0180687. The gelatin was added to the deionized water in the reactor and the mixture stirred at a slow speed and heated until the gelatin had dissolved and the solution had reached 40° C. Separately, the internal phase was heated to 40° C., and introduced slowly below the surface of the gelatin solution, which was stirred continuously. After the addition of the internal phase was complete, the rate of stirring was increased and this stirring continued for 60 minutes at 40° C. in order to emulsify the internal phase into droplets of a size appropriate for the formation of capsules.

Separately, the acacia was dissolved in water and heated to 40° C. The resultant acacia solution was then added rapidly to the reactor, care being taken to avoid foaming. The pH of the resultant mixture was lowered to 4.94-4.96 using 10 percent aqueous acetic acid and the rapid stirring continued for a further 40 minutes at the same temperature. The temperature of the reaction mixture was then lowered to 10° C. over a period of several hours, with continued rapid stirring, and the glutaraldehyde was added. After this addition, the reaction mixture was gradually warmed to 25° C. and stirred vigorously for a further 12 hours. The liquid phase was then removed.

The preformed coacervation process was carried out as follows. The 18437 g of deionized water was placed in the reactor, and the gelatin dissolved therein under gentle stirring, then the resultant solution was heated to 40° C. The rate of stirring was then increased, and the acacia was added in powder form directly to the reactor. After the acacia had dissolved, the mixture was stirred at the same rate for 60 minutes at 40° C. and then its pH was measured; this pH at this point in the process may range from 5.05 to 5.50, depending on the quality of the gelatin used. The internal phase, previously held at room temperature, was added below the surface of the gelatin/acacia solution over a period of about 15 minutes.

After addition of the internal phase had been completed, the resultant mixture was stirred vigorously for 2.5 hours to form the desired droplet size; the droplet size was checked, and if the average size was found to be too large, the stirring rate was increased. After the 2.5 hours of stirring, the makeup water, previously heated to 40° C., was added, and the pH of the mixture measured; again, this pH may range from 5.05 to 5.50 depending on the quality of the gelatin used. The pH of the reaction mixture was then adjusted to approximately 4.90 before entering the cooling step of the process. The rate of stirring was decreased slightly and, after 5 minutes, the reactor was gradually cooled from 40° C. to 10° C. over a period of 5 hours; when the reactor temperature had reached 30° C. (close to the gelatin temperature of gelatin), the stirring was interrupted for 30 minutes (to allow the capsule walls to thicken), then resumed at the same rate as before. When the temperature of the mixture reached 10° C., the glutaraldehyde was added, and after 5 minutes further stirring, the reactor was heated to 25° C. and stirred at the same rate at this temperature for 8-12 hours. Finally, the capsules were separated from the liquid phase.

The results of these experiments are shown in FIG. 1 of the accompanying drawings. From FIG. 1, it will be seen that the PA (control) experiment (Curve A) showed a very broad distribution of capsule sizes, peaking at about 10-12 μm; integration of the curve for the control experiments shows that the yield of capsules in the desired 30-50 μm range was only 23 percent. In contrast, all three preformed coacervate processes of the present invention showed a narrower distribution of capsule sizes, and with improved yields, the yields of capsules in the desired 30-50 μm range being respectively 27, 36 and 57 percent for the PC processes having impeller speeds of 550, 650 and 725 rpm (Curves B, C and D respectively). As expected, the three PC processes showed reduced capsule diameter with increasing impeller speed, with the 725 rpm process (Curve D) producing a peak at about 40 μm capsule diameter.

Figure 2A:
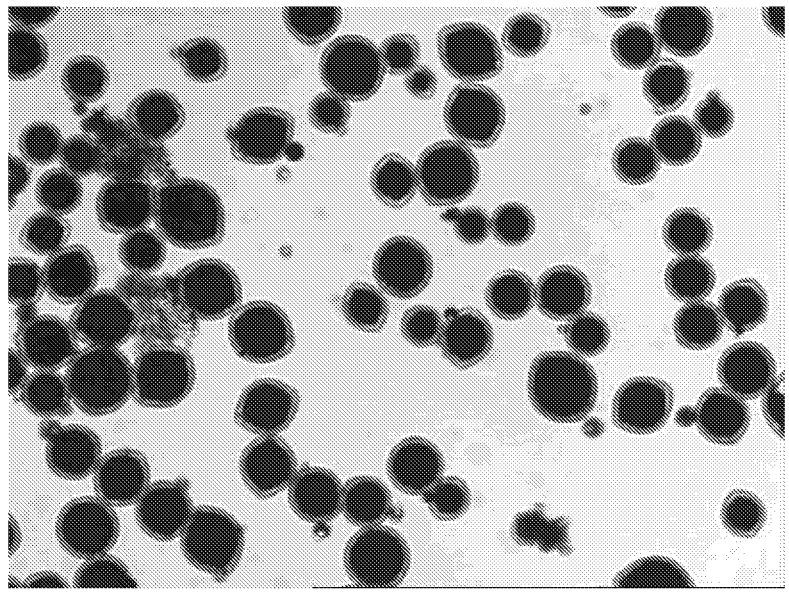
FIG. 2A is a photomicrograph of capsules obtained from one of the preformed coacervate processes described in Example 1 below.
Figure 2B:
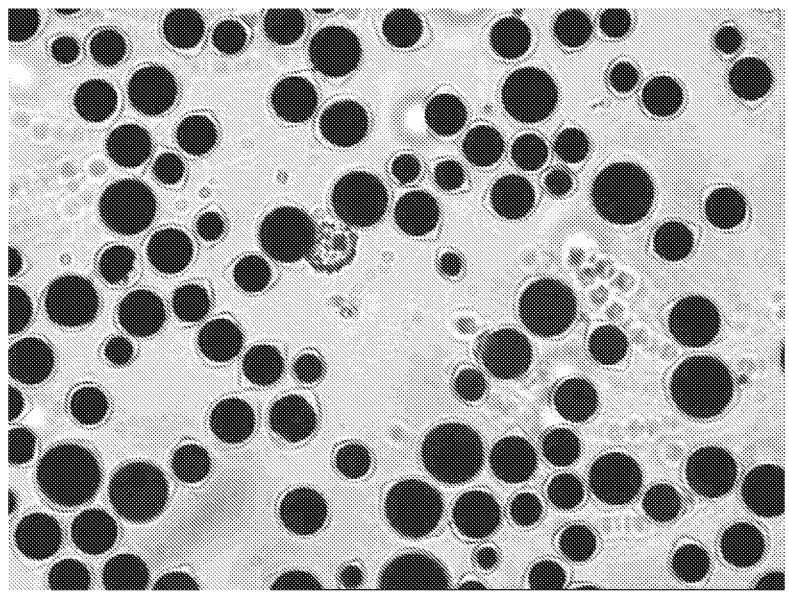
FIG. 2B is a photomicrograph, similar to that of FIG. 2A, of capsules obtained from the control process described in Example 1 below.

The improvement in capsule uniformity produced by the preformed coacervate process is further illustrated in FIGS. 2A and 2B, which are photomicrographs of capsules produced by, respectively, the 725 rpm process of the present invention and the prior art process. The reduced level of fines produced by the present process is readily apparent by comparing these photomicrographs.

From the foregoing, it will be seen that the preformed coacervate process of the present invention provides a substantial improvement in the yield of useful capsules, and thus a substantial reduction in the cost of a given amount of electrophoretic medium produced from such capsules. The present invention also substantially reduces waste disposal costs associated with the disposal of unusable capsules. These advantages can be achieved without the need for new production apparatus, and thus without capital costs. Furthermore, the preformed coacervate process does not require any changes in the composition of either the internal phase or the components used to form the capsule walls, since the present invention requires only a change in the order in which the various materials used to form the capsules are added, and changes in certain process parameters, such as stirring rate, cooling cycle, and mixing near the gelation temperature.

Limited Coalescence Process

As already mentioned, the LC process of the present invention process is a process for encapsulating a water-immiscible phase in a protein coacervate. This LC process comprises forming an aqueous phase comprising a colloidal alumina suspension and a promoter; emulsifying the water-immiscible phase in the aqueous phase under conditions effective to cause the formation of an unstable emulsion comprising small droplets of the water-immiscible phase in the aqueous phase; and admixing the emulsion with the protein and a coacervating agent under conditions permitting coalescence of the emulsion and the formation of capsules of the aqueous phase surrounded by capsule walls of the coacervate.

As already indicated, the major problems in applying limited coalescence processes outside the context in which they were developed are selecting a compatible particulate colloidal stabilizer, and ensuring that any surfactants present not render the fine oil-in-water emulsion initially formed stable against coalescence. Producing capsules for use in electrophoretic displays present particular challenges with respect to both these problems. In practice, the internal phases (i.e., the electrophoretic dispersions, that it to say the suspensions of one or more types of electrophoretic particles in a suspending fluid) used in such capsules require the presence of charging agents to develop and/or maintain the electrical charges on the electrophoretic particles, and these charging agents are typically surface active agents that raise difficulties with respect to both the aforementioned problems. For example, several of the aforementioned E Ink and MIT patents and applications describe internal phases containing as a charging agent Solsperse 17K, a commercial cationic surface active oligomeric material. Because this material is cationic, if one attempts to use an anionic particulate colloidal stabilizer in conjunction therewith, the Solsperse 17K will interact strongly with the anionic material in the aqueous phase or at the oil/water interface, thus rendering the anionic material hydrophobic. The stabilizer will then partition into the internal phase and become ineffective in stabilizing the Pickering emulsion. Hence, a cationic rather than anionic stabilizer must be used with an internal phase containing a cationic stabilizer such as Solsperse 17K.

Also, like many other charging agents used in electrophoretic internal phases, Solsperse 17K is a weakly surface active material in its own right, and will stabilize the formation of an oil-in-water emulsion of the internal phase. The resulting emulsion is a charge-stabilized one, and can be destabilized by addition of a neutral salt, for example potassium nitrate, to the aqueous phase. However, the use of such salts in the aqueous phase interferes with gelatin/acacia coacervation, so that either the aqueous phase must be deionized prior to coacervation or an alternate coacervation process is required.

Preferred forms of the LC process of the present invention provide solutions to both these problems. It has been found that colloidal alumina suspensions are cationic colloidal particulate materials compatible with electrophoretic internal phases and other water-immiscible phases. Such colloidal alumina suspensions are readily available commercially, being manufactured for use in silicon wafer polishing, and can be used without modification in at least some LC processes of the present invention. Examples of such colloidal alumina suspensions which have been found useful in the present LC process are Ultra-sol 201A/60, Ultra-sol 201A/140, and Ultra-sol 201A/280, all available from Eminess Technologies, Inc., Monroe, N.C.

The problems associated with salt addition can be avoided by using as the coacervating agent an anionic polymer, desirably one having a higher charge density and greater degree of hydrophobicity than acacia. The use of such anionic polymers as coacervating agents is discussed in detail in the aforementioned 2004/0012839. Typical examples of such anionic polymers are poly(acrylic acid) and poly(olefin-co-maleic acid), where the olefin component is ethylene, isobutylene, vinyl ether, octene, or a mixed primary olefin. Several of these materials are commercially available from a variety of sources.

There is one further problem which may be encountered in certain LC processes of the invention used for production of electrophoretic media (and possibly other materials), namely degradation of polymer present in the suspending fluid. The aforementioned 2002/0180687 describes how the addition of polyisobutylene and certain other polymers to the suspending fluid of an electrophoretic medium can greatly increase the bistability of the medium without excessively decreasing the switching speed thereof. The vigorous homogenization conditions required in a limited coalescence process to form the initial small particle oil-in-water emulsion are sufficient to degrade polyisobutylene and other high molecular weight polymers in the internal phase to such an extent that the polymer is no longer effective at providing bistability in the resultant electrophoretic medium. If high bistability is necessary, such bistability may be achieved either in the manner described in copending application Ser. No. 10/711,829, filed Oct. 7, 2004 (Publication No. 2005/0168799); this application describes manipulation of a polymeric shell around the electrophoretic particles to increase bistability) or an image stabilizing additive that is not degraded under shear may be used. Examples of such non-shear-degraded additives include aggregating di-block copolymers made from styrene and poly(ethylene-propylene), such as Kraton (Registered Trade Mark) G1701, G1702 or G1730, all available from Kraton Polymers, Inc, Belpre, Ohio).

The following Example is now given, though by way of illustration only, to show the improved capsule yields which can be achieved by the limited coalescence process of the present invention.

EXAMPLE 2

Two identical internal phases were prepared each comprising 42.5 g of a 60 weight percent suspension of a polymer-coated copper chromite pigment in Isopar E (a hydrocarbon solvent available from Exxon Corporation, Houston Tex.; ISOPAR is a Registered Trade Mark), 85 g of a 60 weight percent suspension of a polymer-coated titania pigment in Isopar E, 10.71 g of a solution of Solsperse 17K in Isopar G (a hydrocarbon solvent from the same manufacturer as Isopar E), 0.77 g of Span 80 (a surfactant available from Aldrich Chemical Corporation), and 31.03 g of additional Isopar E.

One of internal phases was used in a control experiment using a prior art encapsulation process substantially as described in the aforementioned 2002/0180687. The emulsification step was carried out by addition of the 140 mL internal phase to a solution of 10 g of gelatin in 240 g water at 42.5° C., and agitating the resulting mixture with a 2 inch (51 mm) prop impeller at 650 rpm for one hour. By this time, the particle size distribution of the emulsion was essentially fixed, as indicated by analysis using a Coulter Counter. Water (153 mL) was then added to the emulsion, followed by a solution of 10 g of acacia in 98 mL of water. At this point, particle size analysis using the Coulter Counter showed the distribution indicated by the curves denoted "Control" in FIGS. 3A and 3B of the accompanying drawings. After cooling the resultant mixture to 10° C., the gelatin/acacia coacervate was crosslinked by addition of about 2 g of a 50 percent solution of glutaraldehyde in water. The capsules were isolated by sedimentation and sieving, using 25 and 38 µm sieves. Capsules remaining on the 25 µm sieve were retained.

The other internal phase was encapsulated by a limited coalescence process of the present invention, as follows. Ultra-sol 201A140 (3.252 g, 19.8 percent solids) was weighed into a 1 L screw-cap jar, and diluted with 300 g of water. The internal phase (70 g) was added, and the mixture shaken by hand to produce a suspension. A promoter (0.644 g of a 1 percent solution of poly(maleic acid-alt-olefin) (molecular weight approximately 12000, from Aldrich Chemical Corporation, Milwaukee, Wis.) in water) was weighed into a small glass vial, and transferred to the suspension with the aid of a few milliliters of water, and the suspension was shaken again. Finally, 50 mL of 0.1 N potassium nitrate solution in water was added. After shaking one more time, the suspension was passed once through a Microfluidizer (Registered Trade Mark) homogenizer (from Microfluidics, Inc.). The homogenized material was poured into a solution of 4 g of gelatin in 140 g of water held at 40° C., and the mixture stirred with an impeller at about 500-600 rpm. To the resultant suspension was added 5 g of a solution of 5% poly(vinyl ether-alt-maleic acid) (prepared by hydrolysis of poly(vinyl ether-alt-maleic anhydride), molecular weight 41000, from Polysciences, Inc., Warren, Pa.). The pH of the stirred suspension was adjusted to 6.1 by addition of a small amount of 2 N sodium hydroxide, and the suspension was then cooled to 10° C. At this point, particle size analysis using the Coulter Counter showed the distribution indicated by the curves marked "Invention" in FIGS. 3A and 3B. A solution of glutaraldehyde (approximately 2 g of a 50 percent solution in water) was then added. After cross linking, the capsules were isolated by sieving as described above.

Figure 3A:
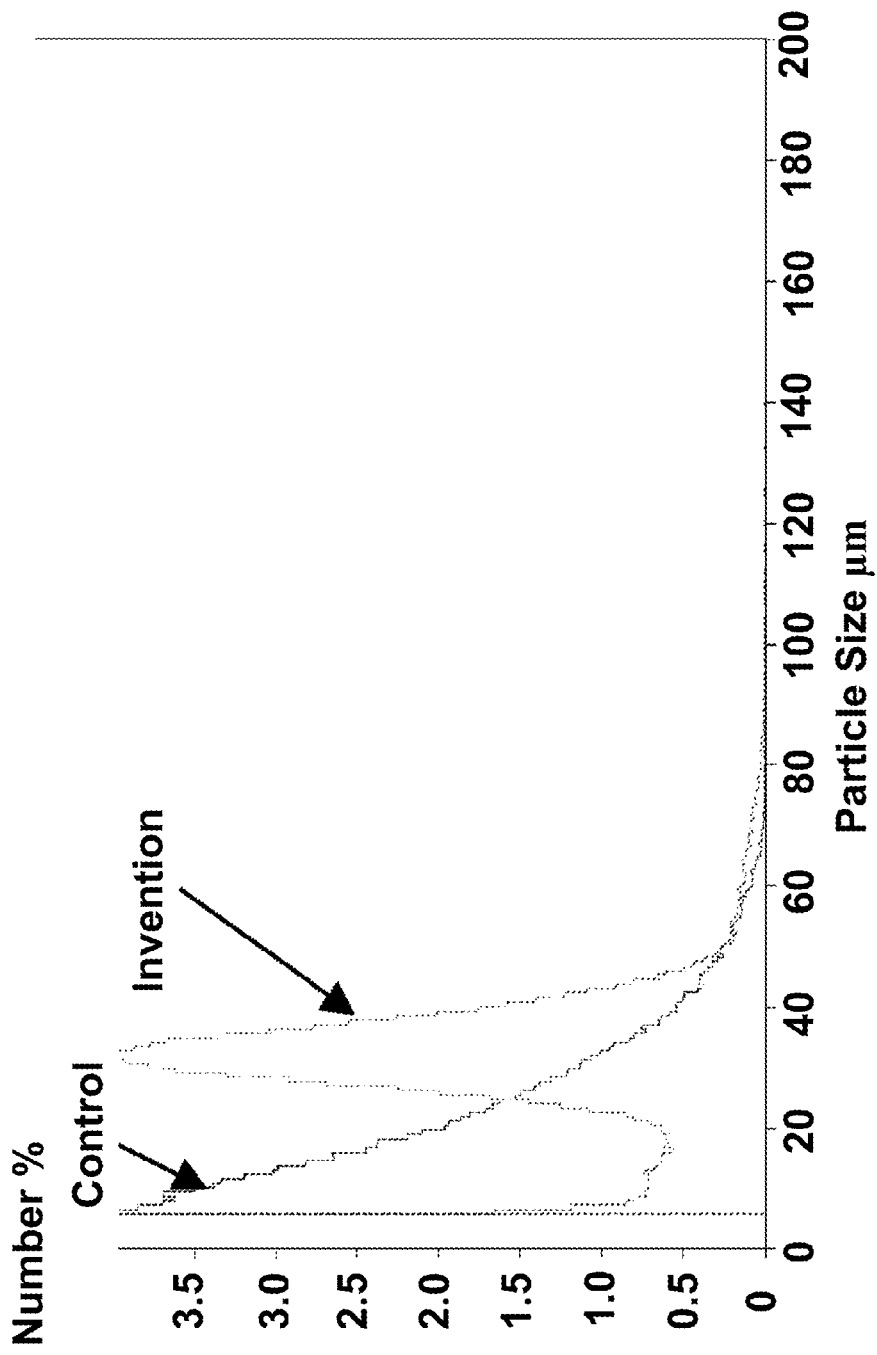
FIG. 3A is a graph showing the number-weighted size distribution of capsules obtained from an LC process of the present invention and a control process in the experiments described in Example 2 below.
Figure 3B:
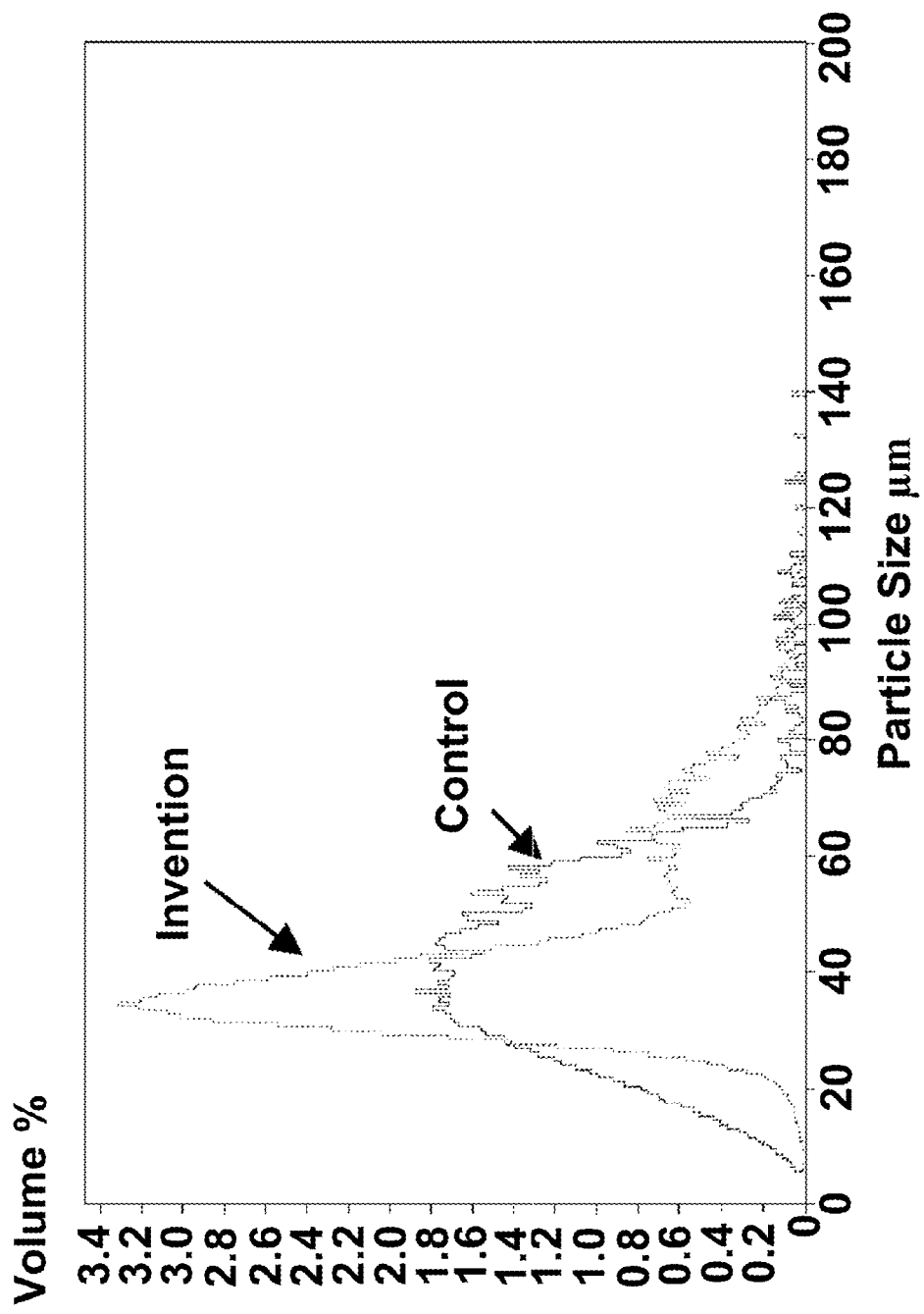
FIG. 3B is a graph similar to that of FIG. 3A but showing the volume-weighted size distribution of capsules obtained from the experiments described in Example 2 below.

From FIGS. 3A and 3B, it will be seen that the LC process of the present invention gave a much tighter particle size distribution than that of the control, with a better yield of particles in the desired size range (25 to 45 µm in this instance). In addition, the process of the present invention resulted in a much smaller population of fine particles. as shown by the quantitative data in Table 2 below:

TABLE 2

|  | Number percent capsules 20-45 μm | Number percent capsules less than 20 μm | Volume percent capsules 20-45 μm | Number percent capsules less than 20 μm |
|---|---|---|---|---|
| Control | 35 | 45 | 53 | 7 |
| Invention | 78 | 11 | 64 | 0.8 |

From this Table, it will be seen that the yield of the desired 20-45 μm capsules produced by the LC process of the present invention was at least 20 percent greater than that of the prior art process, and that the invention reduced the number of fine capsules having diameters less than 20 μm by a factor of at least 4.

Figure 4:
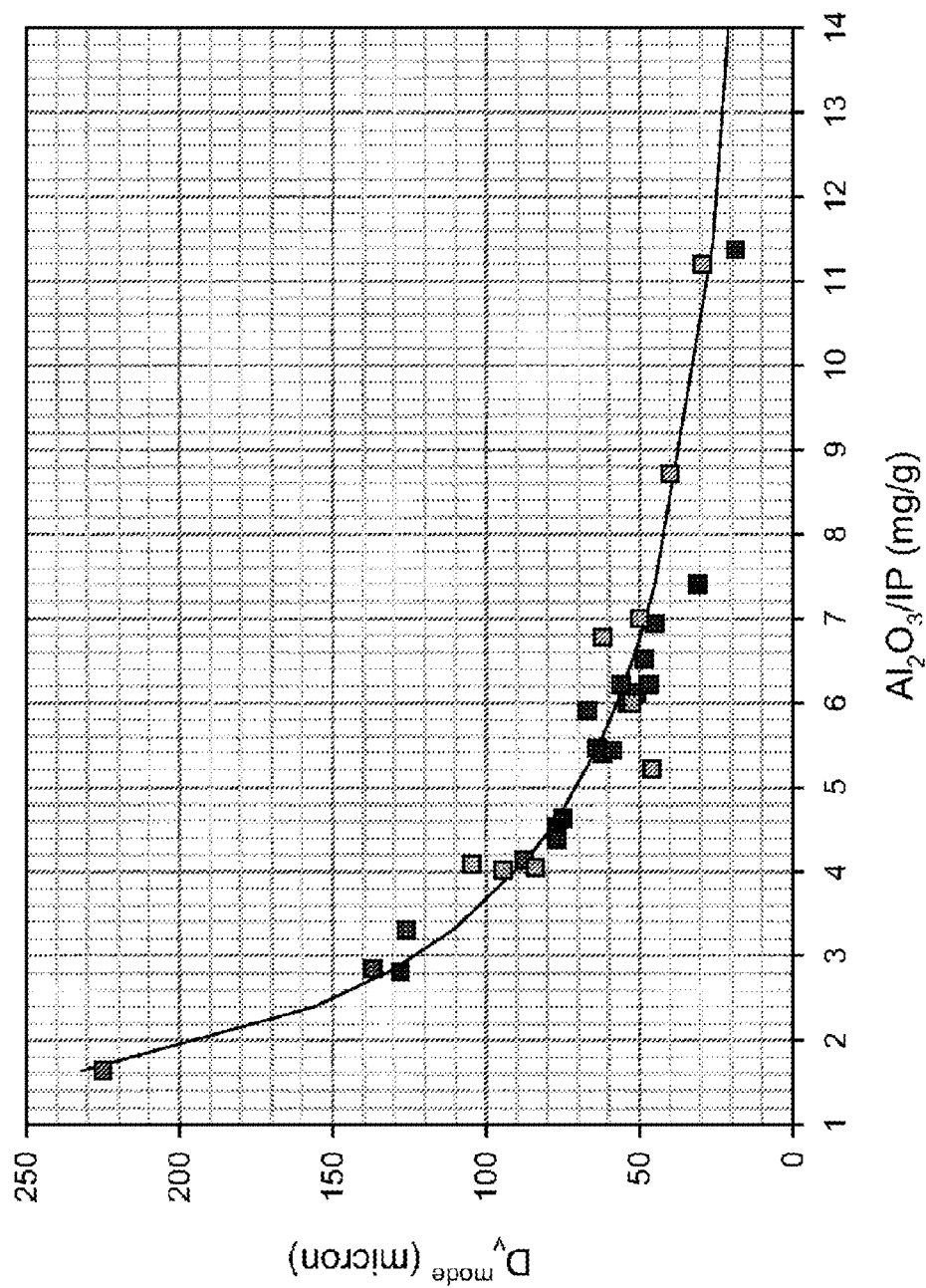
FIG. 4 is a graph showing the variation of capsule size distribution against colloidal alumina content of the aqueous in the experiments described in Example 2 below.

Further experiments were conducted to demonstrate the scalability of the LC process of the present invention. The LC process described above was repeated, except that the ratio of the alumina stabilizer to the internal phase was varied. The results are shown in FIG. 4 of the accompanying drawings, from which it will be seen that the modal capsule size produced by the process was a simple function of the ratio of stabilizer to internal phase, as theory predicts for an LC process.

It was also found experimentally that the LC process of the present invention was insensitive to wide variations in the homogenization method used, as long as the method was sufficient to reduce the droplets of internal phase to a substantially smaller (about ten times smaller) size than that of the capsules eventually desired. In contrast, the development of a desirable particle size distribution by conventional emulsification processes is highly dependent on scale and reactor geometry, and the process thus requires substantial development work for optimization during scale-up.

From the foregoing, it will be seen that the LC process of the present invention provides a substantial improvement in the yield of useful capsules, and a more favorable particle size distribution and should be able to improve process cycle time; thus, the LC process achieves a substantial reduction in the cost of a given amount of electrophoretic medium produced from such capsules. The LC process of the present invention also substantially reduces waste disposal costs associated with the disposal of unusable capsules. These advantages can be achieved without incurring large capital costs. Furthermore, the LC process does not require any changes in the composition of the internal phase. In addition, the LC process of the present invention is more readily scalable than are prior art processes.

Numerous changes and modifications can be made in the preferred embodiments of the present invention already described without departing from the scope of the invention. Accordingly, the whole of the foregoing description is to be construed in an illustrative and not in a limitative sense.

The invention claimed is:

1. A process for encapsulating a water-immiscible phase in a protein coacervate, the process consisting of:
   forming a coacervate of the protein and a coacervating agent in an aqueous medium; and
   thereafter, emulsifying the water-immiscible phase in the aqueous medium comprising the coacervate under conditions effective to cause deposition of the coacervate around the water-immiscible phase, thereby forming capsules of the water-immiscible phase surrounded by capsule walls of the coacervate.

2. A process according to claim 1 wherein the protein is gelatin.

3. A process according to claim 1 wherein the coacervating agent is acacia.

4. A process according to claim 1 wherein the water-immiscible phase comprises an aliphatic hydrocarbon.

5. A process according to claim 4 wherein the water-immiscible phase further comprises solid particles suspended in the hydrocarbon.

6. A process according to claim 5 wherein the solid particles are electrically charged.

7. A process according to claim 6 wherein the water-immiscible phase comprises two different types of solid particles bearing charges of opposite polarity.

8. A process according to claim 1 wherein at least part of the emulsification/capsule formation step is conducted at a temperature below about 35° C.

9. A process for encapsulating a water-immiscible phase in a protein coacervate, the process consisting of:
   forming a coacervate of the protein and a coacervating agent in an aqueous medium;
   thereafter, emulsifying the water-immiscible phase in the aqueous medium comprising the coacervate under conditions effective to cause deposition of the coacervate around the water-immiscible phase, thereby forming capsules of the water-immiscible phase surrounded by capsule walls of the coacervate; and
   thereafter treating the capsules formed with a cross-linking agent effective to cause cross-linking of the protein.

10. A process according to claim 9 wherein the cross-linking agent is an aldehyde.

11. A process according to claim 5 wherein the solid particles comprise titania.

12. A process according to claim 5 wherein the solid particles comprise carbon black.

13. A process according to claim 5 wherein the solid particles comprise copper chromite.

14. A process according to claim 10 wherein the aldehyde is glutaraldehyde.

* * * * *